(12) United States Patent
Kobayashi et al.

(10) Patent No.: US 11,820,062 B2
(45) Date of Patent: Nov. 21, 2023

(54) EXTRUSION METHODS WHEREIN MATERIAL IS GUIDED THROUGH A PASSAGE CROSSING OVER BETWEEN ADJACENT CYLINDRICAL BODIES

(71) Applicants: Shibaura Machine Co., Ltd., Tokyo (JP); HSP Technologies Inc., Ibaraki (JP)

(72) Inventors: Akiyoshi Kobayashi, Fuji (JP); Shigeyuki Fujii, Numazu (JP); Takafumi Sameshima, Mishima (JP); Hiroshi Shimizu, Tsukuba (JP)

(73) Assignees: Shibaura Machine Co., Ltd., Tokyo (JP); HSP Technologies Inc., Ibaraki (JP)

( * ) Notice: Subject to any disclaimer, the term of this patent is extended or adjusted under 35 U.S.C. 154(b) by 168 days.

(21) Appl. No.: 17/355,997

(22) Filed: Jun. 23, 2021

(65) Prior Publication Data
US 2021/0316492 A1    Oct. 14, 2021

Related U.S. Application Data

(60) Division of application No. 15/497,758, filed on Apr. 26, 2017, now Pat. No. 11,072,104, which is a
(Continued)

(30) Foreign Application Priority Data

Oct. 27, 2014  (JP) ................................. 2014-218705

(51) Int. Cl.
*B29C 48/51*    (2019.01)
*B29C 48/49*    (2019.01)
(Continued)

(52) U.S. Cl.
CPC .............. *B29C 48/49* (2019.02); *B29B 7/422* (2013.01); *B29B 7/426* (2013.01); *B29B 7/429* (2013.01);
(Continued)

(58) Field of Classification Search
CPC  B29B 7/489; B29B 7/847; B29B 7/82; B29B 7/90; B29B 7/845; B29B 7/42;
(Continued)

(56) References Cited

U.S. PATENT DOCUMENTS 2,783,498 A * 3/1957 Richardson ........... B30B 11/243
                                                                198/677
3,143,767 A * 8/1964 Wirth .................... B29C 48/345
                                                                366/85
(Continued)

FOREIGN PATENT DOCUMENTS

CN        201058485        5/2008
CN        101973121        2/2011
(Continued)

OTHER PUBLICATIONS

Chinese Office Action (with English Translation) issued in CN 201580058334.7 dated Sep. 30, 2018.
(Continued)

*Primary Examiner* — Charles Cooley
(74) *Attorney, Agent, or Firm* — DLA PIPER LLP US

(57) ABSTRACT

A screw includes a screw main body, a conveyance portion conveying a raw material, and a passage provided in the screw main body. The passage includes a first passage element, a second passage element, and a third passage element. The screw main body has a plurality of cylindrical bodies arranged in an axial direction of the rotating shaft. At least a portion of the conveyance portion is formed on outer peripheral surfaces of the cylindrical bodies adjacent to each
(Continued)

other, and the passage is formed in the cylindrical body so as to cross over between the adjacent cylindrical bodies.

2 Claims, 29 Drawing Sheets

Related U.S. Application Data continuation of application No. PCT/JP2015/080021, filed on Oct. 23, 2015.

(51) Int. Cl.
| | |
|---|---|
| *B29C 48/40* | (2019.01) |
| *B29B 7/42* | (2006.01) |
| *B29B 7/48* | (2006.01) |
| *B29B 7/84* | (2006.01) |
| *B29C 48/57* | (2019.01) |
| *B29C 48/385* | (2019.01) |
| *B29C 48/76* | (2019.01) |
| *B29B 7/74* | (2006.01) |
| *B29C 48/395* | (2019.01) |
| *B29B 7/82* | (2006.01) |
| *B29C 48/00* | (2019.01) |
| *B29C 48/405* | (2019.01) |
| *B29K 33/00* | (2006.01) |
| *B29K 69/00* | (2006.01) |

(52) U.S. Cl.
CPC .............. *B29B 7/483* (2013.01); *B29B 7/487* (2013.01); *B29B 7/489* (2013.01); *B29B 7/7461* (2013.01); *B29B 7/845* (2013.01); *B29C 48/385* (2019.02); *B29C 48/402* (2019.02); *B29C 48/51* (2019.02); *B29C 48/57* (2019.02); *B29C 48/766* (2019.02); *B29B 7/826* (2013.01); *B29C 48/023* (2019.02); *B29C 48/397* (2019.02); *B29C 48/405* (2019.02); *B29K 2033/12* (2013.01); *B29K 2069/00* (2013.01)

(58) Field of Classification Search
CPC ....... B29B 7/421; B29B 7/823; B29B 7/7485; B29B 7/7461; B29B 7/429; B29B 7/482; B29B 7/422; B29B 7/726; B29B 7/426; B29B 7/483; B29B 7/487; B29B 7/826; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29C 48/51; B29C 48/515; B29C 48/49; B29C 48/57; B29C 48/766; B29C 48/023; B29C 48/397; B29C 48/405; B29C 48/65; B29K 2105/251; B29K 2023/12; B29K 2509/00; B29K 2033/12; B29K 2069/00
USPC .................. 425/200–209; 366/79–91
See application file for complete search history.

(56) References Cited

U.S. PATENT DOCUMENTS

| | | | | |
|---|---|---|---|---|
| 3,305,894 A | * | 2/1967 | Pfaff .................... | B29C 48/268 366/85 |
| 3,371,379 A | * | 3/1968 | Reifenhauser ............ | B29B 7/86 366/75 |
| 3,503,944 A | * | 3/1970 | Mohr ................... | B29C 48/022 422/135 |
| 3,638,455 A | * | 2/1972 | Francois .................. | F16D 3/06 464/181 |
| 3,653,637 A | * | 4/1972 | Eckhardt ............... | B29C 45/464 366/89 |
| 3,712,594 A | * | 1/1973 | Schippers ............. | B29C 48/766 366/89 |
| 3,746,318 A | * | 7/1973 | Schippers ................ | B29B 7/42 366/79 |
| 3,795,386 A | * | 3/1974 | Carter .................... | F16J 15/406 100/145 |
| 3,797,550 A | * | 3/1974 | Latinen ................. | B01D 1/226 366/323 |
| 3,799,234 A | * | 3/1974 | Skidmore ............. | B29C 48/535 528/502 F |
| 3,884,452 A | * | 5/1975 | Britten ................. | B29C 48/695 366/85 |
| 3,917,507 A | * | 11/1975 | Skidmore ............. | B29C 48/762 264/102 |
| 3,924,842 A | * | 12/1975 | Klein ...................... | B29C 48/51 366/318 |
| 3,963,558 A | * | 6/1976 | Skidmore ............... | B29C 48/76 264/102 |
| 3,985,348 A | * | 10/1976 | Skidmore ............... | B29C 48/29 366/76.9 |
| 3,993,292 A | * | 11/1976 | Skidmore ............... | B29C 48/29 366/87 |
| 3,999,921 A | * | 12/1976 | Thor ........................ | B29B 7/42 366/76.9 |
| 4,082,488 A | * | 4/1978 | Brinkschroder ...... | B29C 48/402 366/85 |
| 4,100,244 A | * | 7/1978 | Nonaka ................. | B29C 48/767 264/28 |
| 4,118,163 A | * | 10/1978 | Lee ........................ | B29B 7/726 425/208 |
| 4,162,854 A | * | 7/1979 | Ullrich .................. | B29C 48/402 366/83 |
| 4,169,679 A | * | 10/1979 | Miller ..................... | B29C 48/05 366/76.1 |
| 4,279,275 A | * | 7/1981 | Stanwood ................ | F16D 1/06 464/181 |
| 4,290,702 A | * | 9/1981 | Klein .................... | B29C 45/5092 366/77 |
| 4,302,409 A | * | 11/1981 | Miller ................... | B29C 48/304 264/45.9 |
| 4,329,313 A | * | 5/1982 | Miller ................... | B29C 48/535 366/89 |
| 4,387,997 A | * | 6/1983 | Klein ...................... | B29B 7/429 425/208 |
| 4,423,960 A | * | 1/1984 | Anders .................... | B29C 48/40 366/85 |
| 4,472,059 A | * | 9/1984 | Klein .................... | B29C 48/395 366/293 |
| 4,474,473 A | * | 10/1984 | Higuchi ................ | B29C 48/767 366/85 |
| 4,534,652 A | * | 8/1985 | Stade ...................... | B29B 7/488 366/85 |
| 4,600,311 A | * | 7/1986 | Mourrier ............. | B29C 48/2564 366/322 |
| 4,637,790 A | * | 1/1987 | Klein .................... | B29C 48/395 425/208 |
| 4,645,445 A | * | 2/1987 | Takanashi ........... | B29C 48/2556 366/89 |
| 4,744,669 A | * | 5/1988 | Kowalczyk ............. | B29B 7/485 366/85 |
| 4,752,135 A | * | 6/1988 | Loomans ................ | B29B 7/845 366/85 |
| 4,802,140 A | * | 1/1989 | Dowling ................ | B29B 7/42 366/144 |
| 4,807,351 A | * | 2/1989 | Berg ...................... | B21D 26/14 403/283 |
| 4,826,323 A | * | 5/1989 | Loomans ................ | B29B 7/826 366/85 |
| 4,875,796 A | * | 10/1989 | Storm .................... | F16D 1/104 403/345 |
| 4,875,847 A | * | 10/1989 | Wenger ................. | B30B 11/243 366/85 |

(56) References Cited

U.S. PATENT DOCUMENTS

| | | | | | |
|---|---|---|---|---|---|
| 4,902,455 | A | * | 2/1990 | Wobbe | B29B 7/726 264/102 |
| 4,959,186 | A | * | 9/1990 | Dollhopf | B29C 48/745 425/173 |
| 4,983,114 | A | * | 1/1991 | Hauck | B29C 48/40 366/85 |
| 5,056,925 | A | | 10/1991 | Klein | |
| 5,102,594 | A | * | 4/1992 | Burlet | B29C 48/766 159/2.3 |
| 5,130,070 | A | * | 7/1992 | Martin | B29C 48/76 264/102 |
| 5,304,012 | A | * | 4/1994 | Wendling | B21K 25/00 403/359.6 |
| 5,358,681 | A | * | 10/1994 | Jerman | B29C 48/41 159/2.3 |
| 5,499,870 | A | * | 3/1996 | Rockstedt | B29C 48/402 366/85 |
| 5,547,277 | A | * | 8/1996 | Caspelherr | B29C 48/84 366/147 |
| 5,662,415 | A | * | 9/1997 | Gisko | B29B 7/845 366/139 |
| 5,804,111 | A | * | 9/1998 | Kobayashi | B29C 48/57 425/149 |
| 5,843,489 | A | * | 12/1998 | Nakano | B29B 7/488 366/147 |
| 6,024,479 | A | * | 2/2000 | Haring | B29C 48/405 366/85 |
| 6,042,260 | A | * | 3/2000 | Heidemeyer | B29C 48/405 366/100 |
| 6,220,745 | B1 | * | 4/2001 | Kobayashi | B29B 7/488 366/291 |
| 6,958,128 | B2 | * | 10/2005 | Gates | B29B 7/421 366/85 |
| 6,997,596 | B1 | * | 2/2006 | Eigruber | B29C 48/2564 366/81 |
| 8,048,948 | B2 | * | 11/2011 | Shimizu | B29B 7/90 524/502 |
| 8,975,336 | B2 | * | 3/2015 | Shimizu | B29C 48/832 525/461 |
| 9,199,393 | B2 | * | 12/2015 | Shimizu | B29B 7/28 |
| 10,967,554 | B2 | * | 4/2021 | Kobayashi | B29B 7/489 |
| 11,072,104 | B2 | * | 7/2021 | Kobayashi | B29B 7/426 |
| 11,110,638 | B2 | * | 9/2021 | Kobayashi | B29C 48/51 |
| 11,220,022 | B2 | * | 1/2022 | Kobayashi | B29C 48/535 |
| 11,224,991 | B2 | * | 1/2022 | Kobayashi | B29B 7/7485 |
| 11,229,889 | B2 | * | 1/2022 | Kobayashi | B29B 7/42 |
| 11,230,033 | B2 | * | 1/2022 | Kobayashi | B01F 27/1143 |
| 11,400,632 | B2 | * | 8/2022 | Kobayashi | B29C 48/67 |
| 11,400,633 | B2 | * | 8/2022 | Kobayashi | B29C 48/397 |
| 11,565,440 | B2 | * | 1/2023 | Kobayashi | B29B 7/84 |
| 11,584,830 | B2 | * | 2/2023 | Sameshima | C08J 3/203 |
| 2002/0186612 | A1 | * | 12/2002 | Murakami | B29C 48/92 366/147 |
| 2003/0206482 | A1 | * | 11/2003 | Griggs | B29C 48/402 366/85 |
| 2004/0222543 | A1 | * | 11/2004 | Innerebner | B29B 7/603 264/102 |
| 2004/0238990 | A1 | * | 12/2004 | Hermann | B29C 48/385 264/102 |
| 2005/0087904 | A1 | * | 4/2005 | Bryan | B27N 3/28 264/211 |
| 2005/0111294 | A1 | * | 5/2005 | Gates | B29B 7/429 366/85 |
| 2006/0108706 | A1 | * | 5/2006 | Galimberti | B29C 48/37 425/204 |
| 2008/0267003 | A1 | * | 10/2008 | Kasliwal | B29C 48/022 366/85 |
| 2009/0175118 | A1 | * | 7/2009 | Kasliwal | B29B 7/603 366/85 |
| 2011/0282006 | A1 | | 11/2011 | Shimizu et al. | |
| 2013/0163373 | A1 | * | 6/2013 | Yamaguchi | B29C 48/67 366/300 |
| 2014/0027095 | A1 | * | 1/2014 | Warchol | B29C 48/845 165/87 |
| 2016/0207225 | A1 | * | 7/2016 | Kobayashi | B29C 48/57 |
| 2016/0303766 | A1 | * | 10/2016 | Kobayashi | B29B 7/42 |
| 2016/0332331 | A1 | * | 11/2016 | Kobayashi | B29C 48/54 |
| 2016/0332332 | A1 | * | 11/2016 | Kobayashi | B29B 7/42 |
| 2017/0021547 | A1 | * | 1/2017 | Kobayashi | B29C 48/298 |
| 2017/0050366 | A1 | * | 2/2017 | Kobayashi | B29B 7/845 |
| 2017/0050367 | A1 | * | 2/2017 | Kobayashi | B29C 48/57 |
| 2017/0113394 | A1 | * | 4/2017 | Kobayashi | B29B 7/484 |
| 2017/0225360 | A1 | * | 8/2017 | Kobayashi | B29B 7/489 |
| 2017/0225379 | A1 | * | 8/2017 | Kobayashi | B29B 7/489 |
| 2018/0093233 | A1 | * | 4/2018 | Kobayashi | B29C 48/507 |
| 2018/0093234 | A1 | * | 4/2018 | Kobayashi | B29B 7/483 |
| 2019/0352472 | A1 | * | 11/2019 | Sameshima | C08F 236/10 |
| 2020/0282622 | A1 | * | 9/2020 | Ougier | B29C 48/85 |
| 2021/0154906 | A1 | * | 5/2021 | Kobayashi | B29C 48/67 |
| 2021/0316492 | A1 | * | 10/2021 | Kobayashi | B29B 7/483 |
| 2021/0354362 | A1 | * | 11/2021 | Kobayashi | B29B 7/483 |
| 2021/0362374 | A1 | * | 11/2021 | Sameshima | C08J 3/005 |
| 2022/0305704 | A1 | * | 9/2022 | Sameshima | C08L 101/00 |
| 2022/0325455 | A1 | * | 10/2022 | Sasai | B29C 48/298 |
| 2023/0091065 | A1 | * | 3/2023 | Chastek | B29C 48/252 264/211.21 |

FOREIGN PATENT DOCUMENTS

| | | | | |
|---|---|---|---|---|
| CN | 102076859 | | 5/2011 | |
| CN | 103764368 | | 4/2014 | |
| DE | 24 54 785 | | 5/1976 | |
| DE | 25 48 490 | | 5/1977 | |
| DE | 3026842 | A * | 2/1982 | B29C 47/38 |
| DE | 3744193 | C * | 1/1989 | B29C 47/364 |
| DE | 102011014474 | A1 * | 9/2012 | B23P 15/00 |
| EP | 3650196 | A1 * | 5/2020 | |
| EP | 2822748 | B1 * | 8/2020 | B29C 44/3446 |
| JP | S50-143863 | | 11/1975 | |
| JP | 52-72573 | | 5/1977 | |
| JP | S58-25943 | | 2/1983 | |
| JP | 02120006 | A * | 5/1990 | B29C 47/44 |
| JP | H07-266404 | | 10/1995 | |
| JP | 07329150 | A * | 12/1995 | B29C 47/369 |
| JP | 2002-1794 | | 1/2002 | |
| JP | 2005035286 | A * | 2/2005 | B29C 48/022 |
| JP | 2010-058329 | | 3/2010 | |
| JP | 2011-073450 | | 4/2011 | |
| JP | 2013-71428 | | 4/2013 | |
| JP | 2014-19045 | | 2/2014 | |
| SU | 889462 | A2 * | 12/1981 | |
| TW | 473423 | | 1/2002 | |
| WO | WO-2005028184 | A1 * | 3/2005 | B29C 45/581 |
| WO | WO-2007033328 | A2 * | 3/2007 | B29B 7/484 |
| WO | WO 2010/061872 | | 6/2010 | |
| WO | WO 2013/133453 | | 9/2013 | |
| WO | WO-2015156230 | A1 * | 10/2015 | B29B 7/421 |
| WO | WO-2015163119 | A1 * | 10/2015 | B29B 7/42 |
| WO | WO-2015163197 | A1 * | 10/2015 | B29B 7/38 |
| WO | WO-2015170568 | A1 * | 11/2015 | B29B 7/38 |
| WO | WO-2015170616 | A1 * | 11/2015 | B29B 7/38 |
| WO | WO-2015170617 | A1 * | 11/2015 | B29B 7/38 |
| WO | WO-2016068048 | A1 * | 5/2016 | B29B 7/42 |
| WO | WO-2016068049 | A1 * | 5/2016 | B29B 7/40 |
| WO | WO-2016175081 | A1 * | 11/2016 | B01F 15/06 |
| WO | WO-2016175082 | A1 * | 11/2016 | B01F 15/06 |
| WO | WO-2019198479 | A1 * | 10/2019 | B29B 7/42 |
| WO | WO-2021191718 | A1 * | 9/2021 | B29C 48/397 |

OTHER PUBLICATIONS

Korean Office Action in KR Application 10-2017-7014523, dated Dec. 4, 2018.

International Search Report (with English Translation) issued in PCT/JP 2015/080021 dated Jan. 19, 2016.

Written Opinion (with English Translation) issued in PCT/JP 2015/080021 dated Jan. 19, 2016.

Taiwan Office Action (with English Translation) issued in TW 104135236 dated Aug. 2, 2015.

(56) References Cited

OTHER PUBLICATIONS

English Language Abstract and Translation of JP 2010-058329 published Mar. 18, 2010.
English Language Abstract and Translation of JP 2011-073450 published Apr. 14, 2011.
English Language Abstract and Translation of TW 473423 published Jan. 21, 2002.
English Language Abstract and Translation of CN 102076859 published May 25, 2011.
Japanese Office Action issued in JP 2014-218705 dated Aug. 21, 2018.
English Language Abstract and Translation of CN 101973121 published Feb. 16, 2011.
English Language Abstract and Translation of CN 103764368 published Apr. 30, 2014.
English Language Abstract and Translation of CN 201058485 published May 14, 2008.
German Office Action in DE Application No. 11 2015 004 855.3, dated Sep. 7, 2021.
U.S. Appl. No. 15/497,758, filed Apr. 26, 2017, Patented.

\* cited by examiner

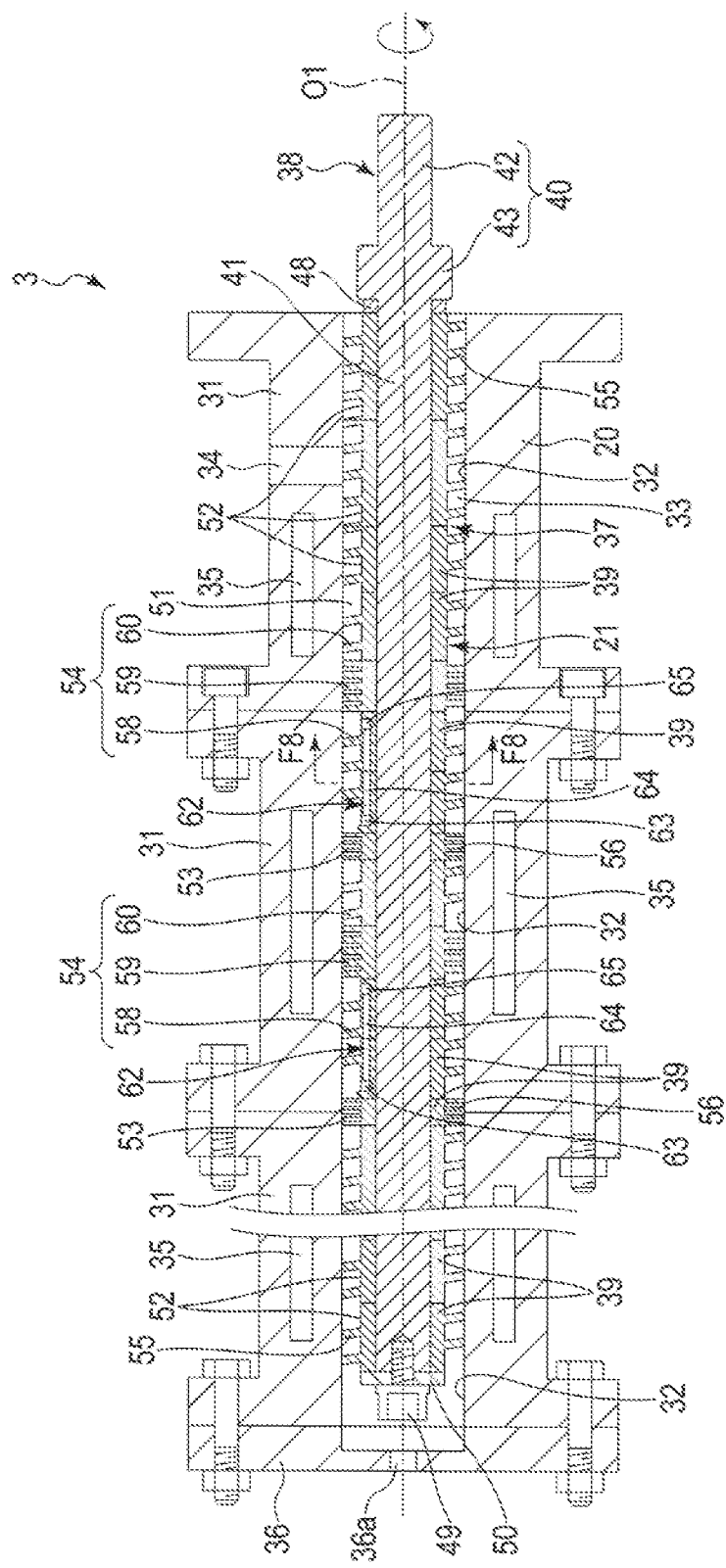
F I G. 6

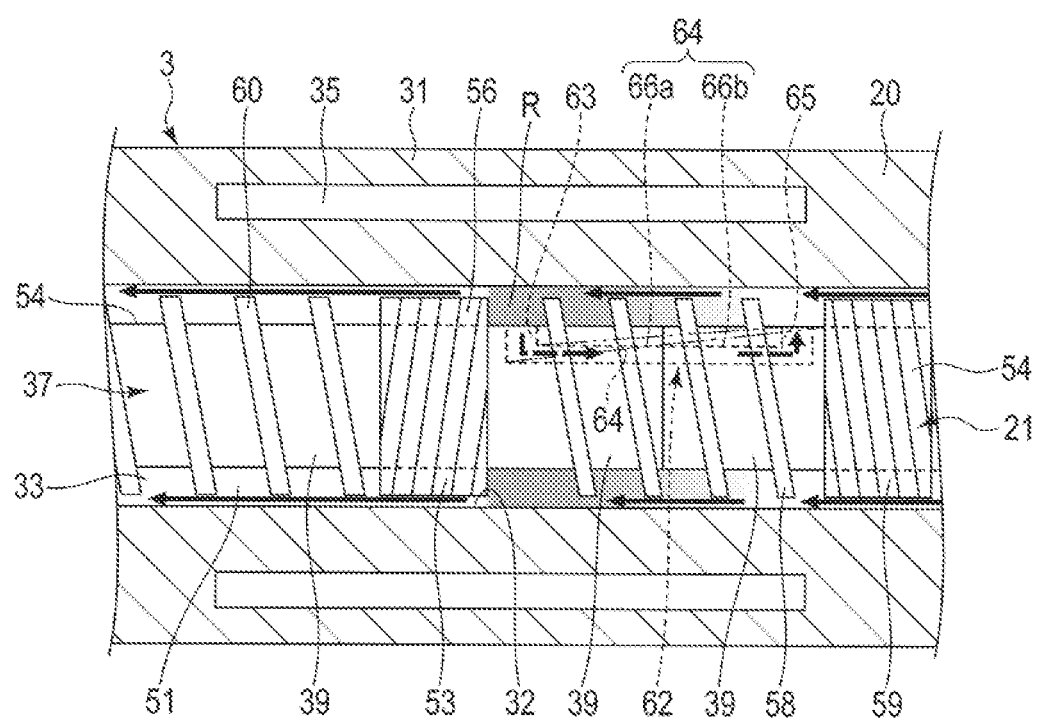
F I G. 11

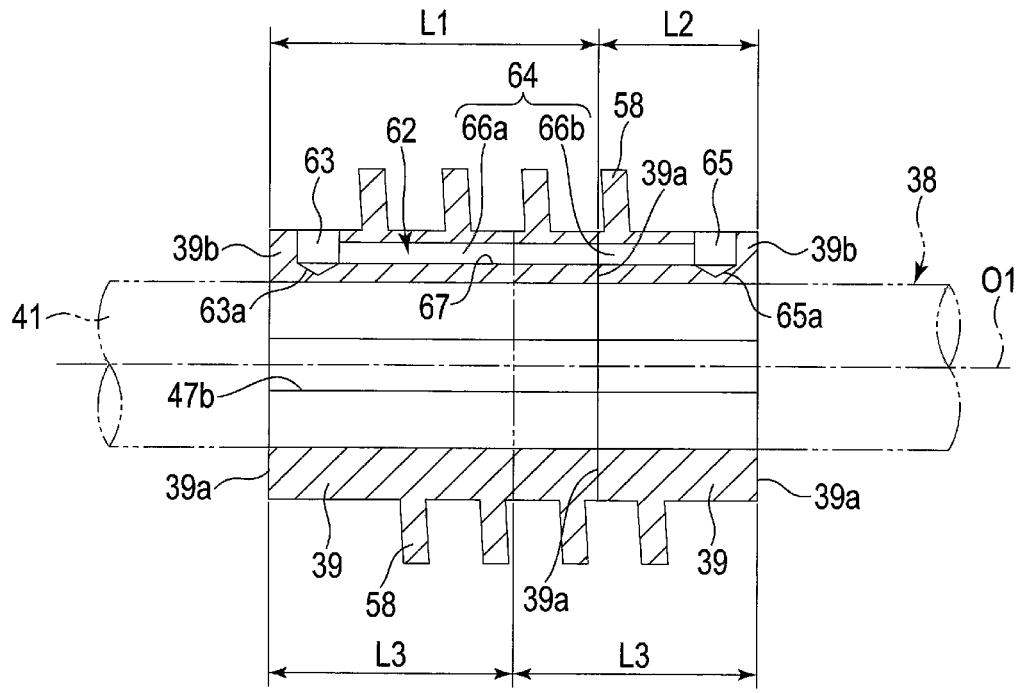
F I G. 12
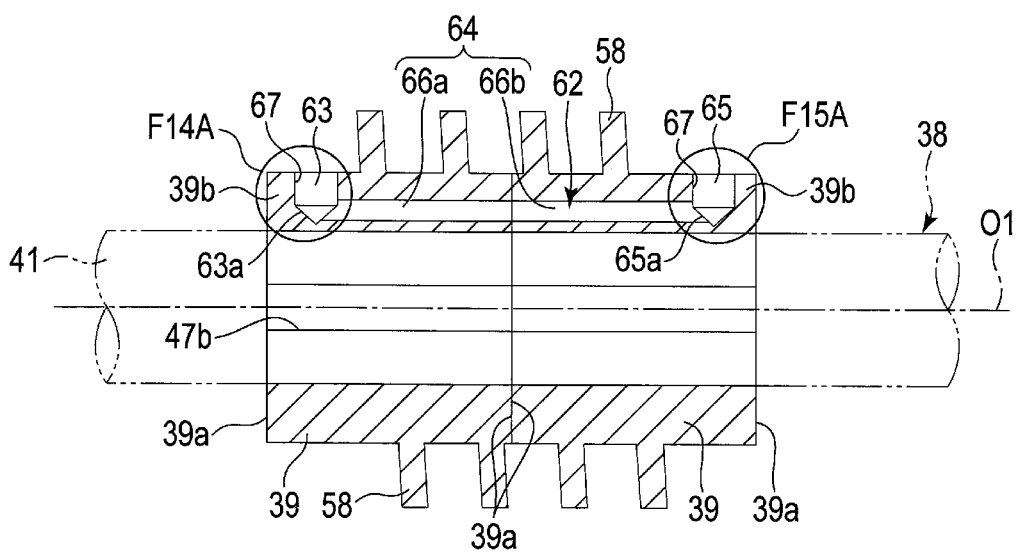
F I G. 13

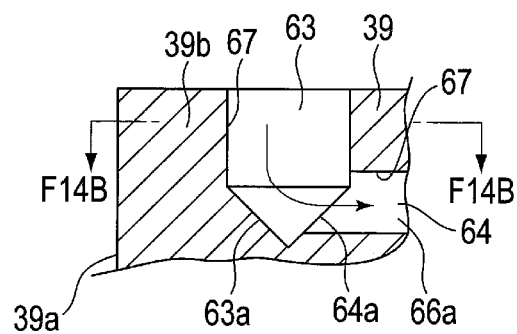
F I G. 14A
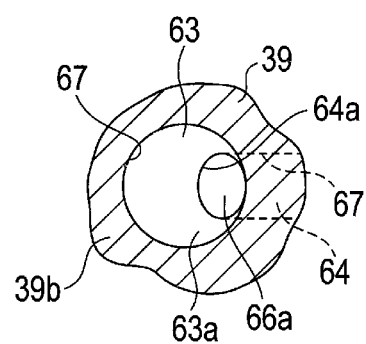
F I G. 14B

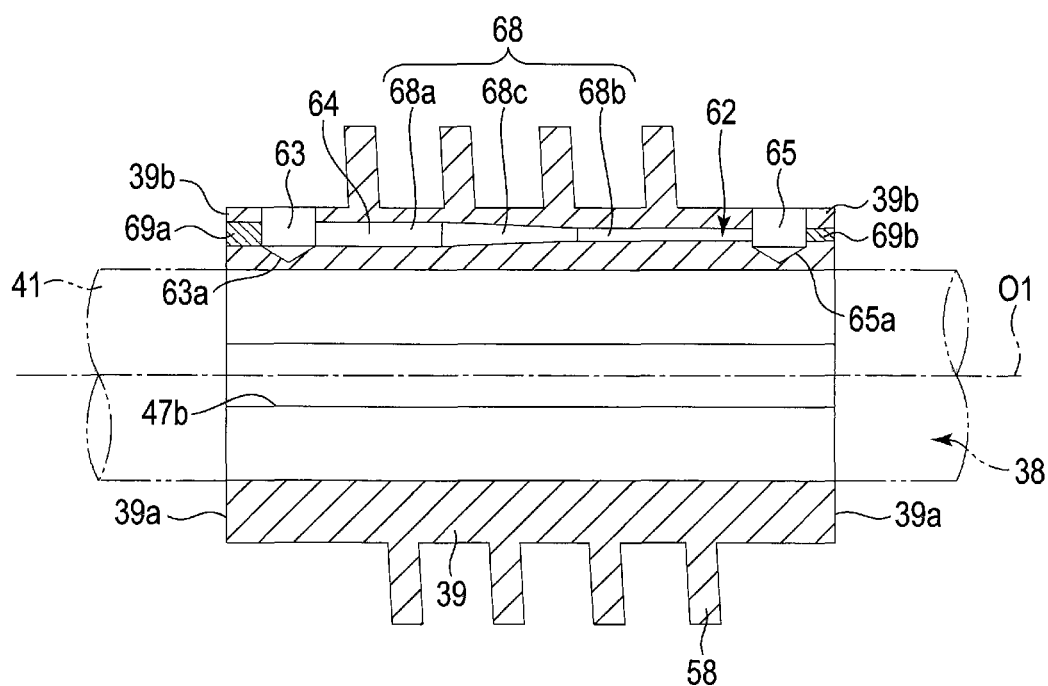
F I G. 18

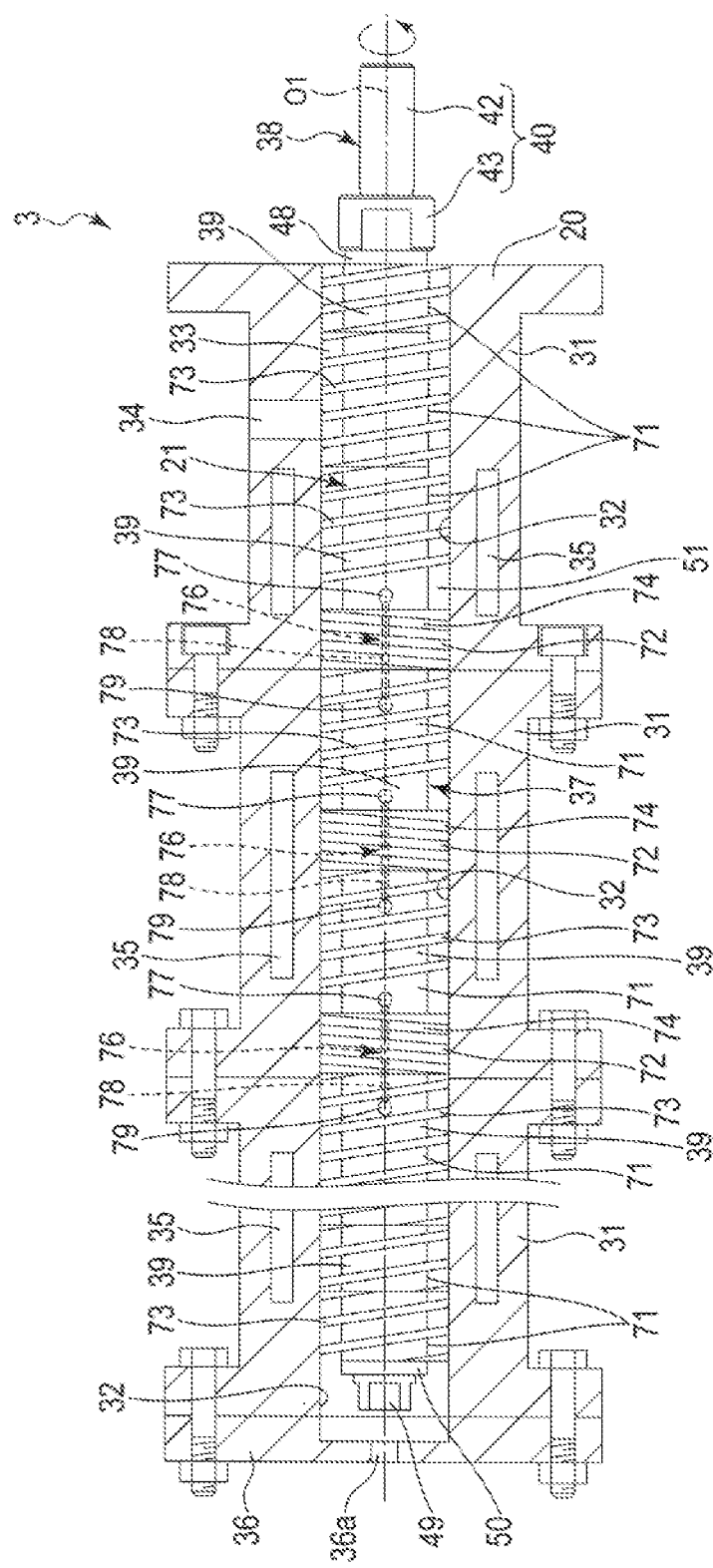
F I G. 19

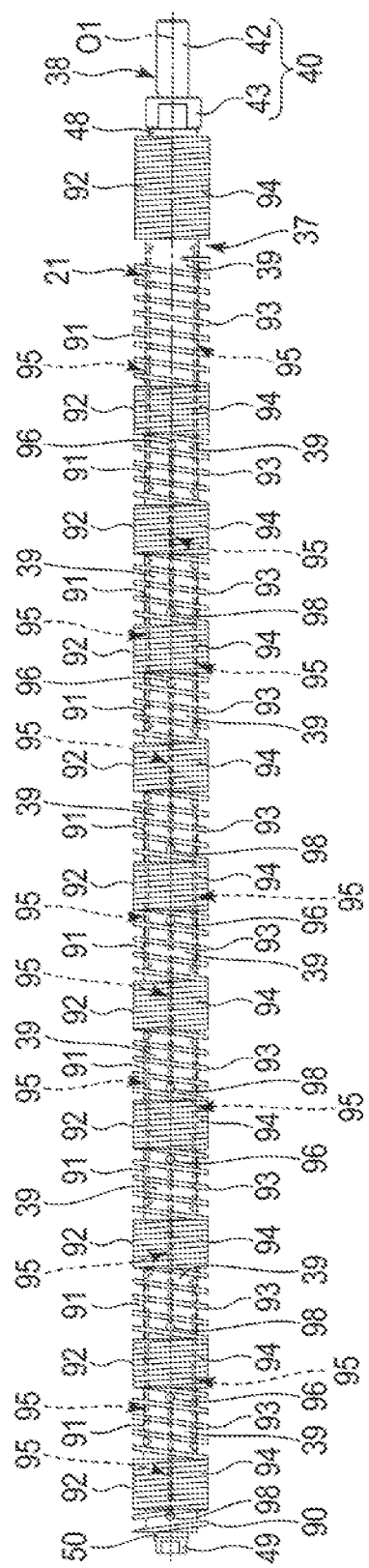
F I G. 28

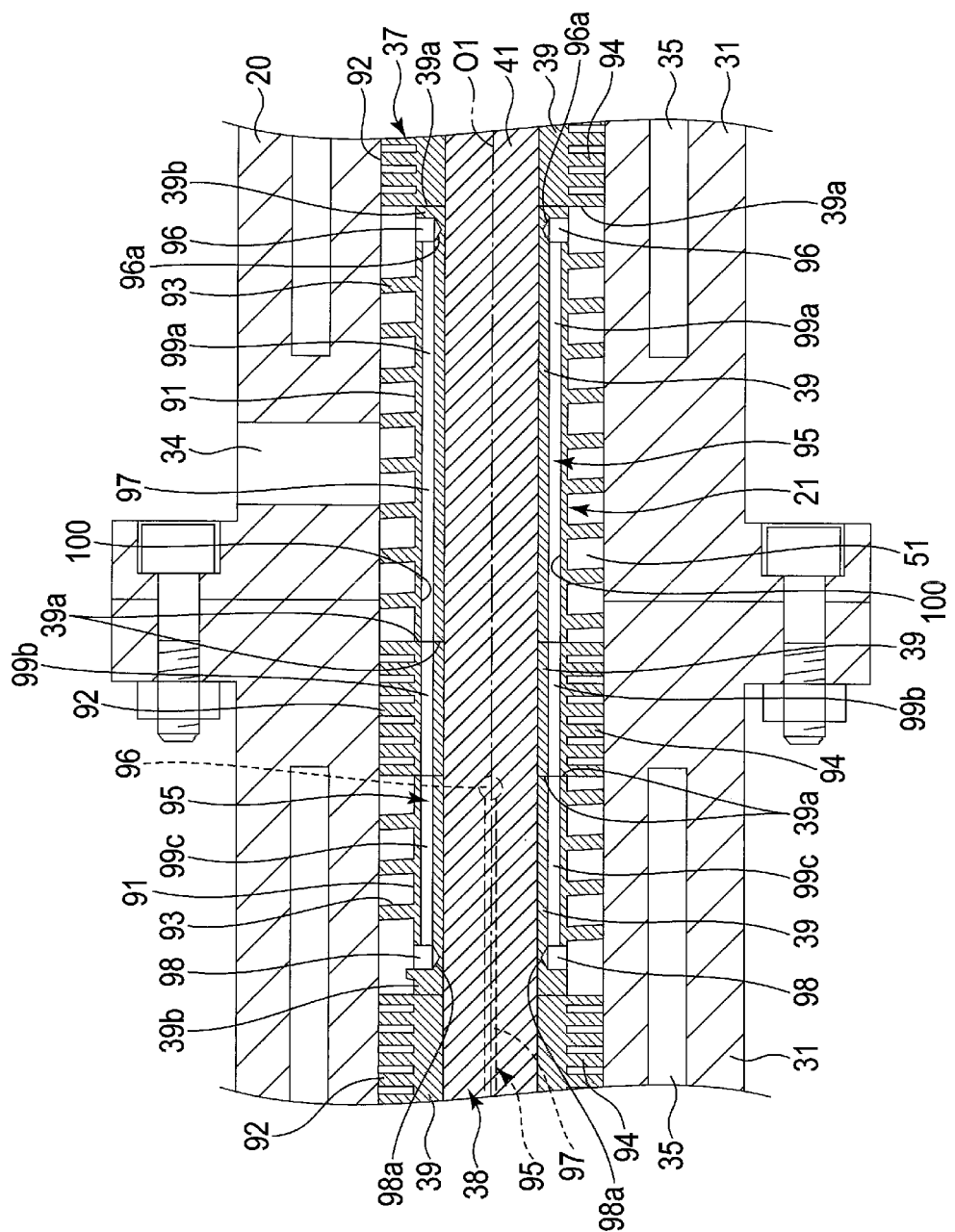
F I G. 31

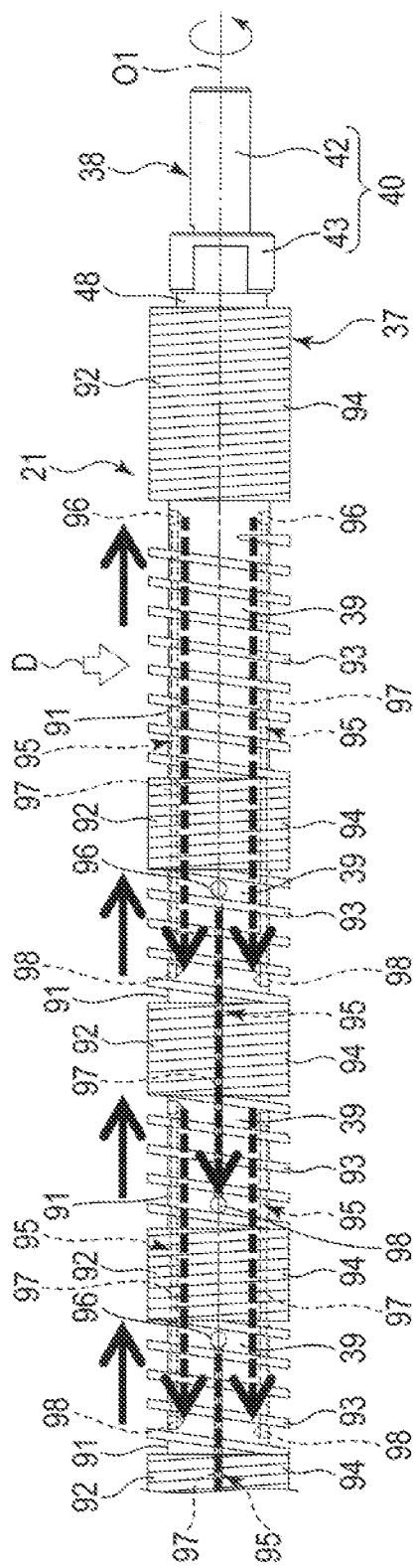
F I G. 32

EXTRUSION METHODS WHEREIN MATERIAL IS GUIDED THROUGH A PASSAGE CROSSING OVER BETWEEN ADJACENT CYLINDRICAL BODIES

CROSS REFERENCE TO RELATED APPLICATIONS

This application is a divisional of U.S. patent application Ser. No. 15/497,758 filed Apr. 26, 2017, which is a Continuation Application of PCT Application No. PCT/JP2015/080021, filed Oct. 23, 2015 and based upon and claiming the benefit of priority from prior Japanese Patent Application No. 2014-218705, filed Oct. 27, 2014, the entire contents of all of which are incorporated herein by reference.

BACKGROUND OF THE INVENTION

1. Field of the Invention

Embodiments of the present invention relate to a screw for an extruder, which kneads a blended raw material while applying the shear action and the elongation action to the raw material, and a screw element used in the screw for an extruder. The embodiments of this invention further relate to an extruder, which produces a kneaded material with the use of the screw for an extruder, and an extrusion method.

2. Description of the Related Art

When a raw material obtained by blending a plurality of incompatible resins with an extruder in which a rotation speed of a screw is set to approximately 300 rpm is kneaded, a compatibilizing agent having compatibility or adherence property with respect to one or both of blend components is required to be applied. However, even if the compatibilizing agent is used, since the blended components are not mutually dissolved at a molecular level, there are natural limits to improvement of performance and functions of a kneaded material produced by the extruder.

In order to solve such a problem, in the prior art, there has been developed a batch-type high shear molding apparatus which can produce a kneaded material obtained by kneading raw materials at the nano-level without applying any additive such as a compatibilizing agent.

A batch-type high shear molding apparatus disclosed in Patent Literature 1 (WO 2010/061872 A) includes a feedback type screw contained in a cylinder. The screw has a structure in which a raw material obtained by blending incompatible resins is satisfactorily kneaded inside the screw.

Specifically, the screw has a linear axis line along a conveyance direction of the raw material and rotates inside the cylinder around the axis line. A spirally twisted flight is formed on an outer peripheral surface of the screw. The flight conveys the raw material, supplied to a base end of the screw, toward a leading end of the screw. The raw material conveyed by the flight is trapped in a gap between a leading end surface of the screw and a sealing member closing an opening end of the cylinder.

The screw has a hole having an inner diameter of approximately 1 mm to 5 mm at its substantially center portion. The hole extends in the axis line direction of the screw. The upstream end of the hole is opened to the gap in the leading end surface of the screw. The downstream end of the hole is bifurcated and opened in an outer peripheral surface of the base end of the screw.

The raw material trapped in the gap flows through the hole from the upstream end of the hole along with the rotation of the screw and, at the same time, is returned to the outer peripheral surface of the base end of the screw from the downstream end of the hole. The returned raw material is conveyed toward the gap again by the flight.

When the screw is thus of a feedback type, the raw material supplied to the screw is subjected to the shear action in process of being conveyed by the flight and, at the same time, subjected to the elongation action in process of passing through the hole. Consequently, the raw material circulates in a closed space in the cylinder while being accompanied by a shear flow and an elongation flow, and a polymer component of the raw material is nano-dispersed according to the time required for the circulation of the raw material.

On the other hand, Patent Literature 1 describes a kneaded material obtained when a polycarbonate resin (PC) and a polymethyl methacrylate resin (PMMA) are kneaded using the feedback type screw.

Specifically, when the raw material is circulated in the closed space in the cylinder for two minutes while rotating the screw at 1800 rpm, a transparent kneaded material is obtained, and when the screw rotation speed is changed from 1800 rpm to 300 rpm, the kneaded material does not become transparent, but becomes white.

Further, in the batch-type high shear molding apparatus disclosed in Patent Literature 1, a relationship between the screw rotation speed and the circulating time of the raw material is an important element in deciding a kneading degree of the raw material. Namely, when the screw rotation speed is 600 rpm to 3000 rpm, the circulating time of the raw material is required to be set to 5 seconds to 60 minutes, and when the screw rotation speed is 1200 rpm to 2500 rpm, the circulating time of the raw material is required to be set to 5 seconds to 4 minutes.

In order to enhance productivity of a kneaded material, it is essential that the kneaded material is continuously delivered from a cylinder. However, in the high shear molding apparatus disclosed in Patent Literature 1, the kneaded material cannot be delivered from the cylinder during circulation of the raw material in the closed space in the cylinder. Thus, the kneaded material cannot be continuously taken out from the cylinder without interruption, and thus it is difficult to satisfy such a requirement that the productivity of the kneaded material is intended to be enhanced.

According to the batch-type high shear molding apparatus, the elongation action and the shear action are alternately and repeatedly applied to the raw material during circulation of the raw material in the closed space. The kneading degree of the raw material is not determined by the circulating time of the raw material alone, and the relationship between the screw rotation speed and the circulating time of the raw material greatly influences on the kneading degree of the raw material.

Thus, in order to adjust the kneading degree of the raw material, the screw rotation speed and the circulating time of the raw material should be related to each other, so that it cannot be avoided that the adjustment range becomes narrow or the adjustment conditions are limited.

In addition, the strengths of the shear action and the elongation action applied to the raw material are determined according to the shape of the flight and the inner diameter and length of the hole. In the high shear molding apparatus disclosed in Patent Literature 1, the screw is an integral structure, and the flight and the hole are formed on a solid shaft member.

According to such a constitution, since the shape of the flight and the inner diameter and length of the hole are fixedly determined for each screw, when distribution of the shear action and the elongation action applied to the raw material is changed, a screw different in the shape of the flight and the inner diameter and length of the hole is required to be provided in each case, and, at the same time, a troublesome operation such as replacement of the entire screw is forced.

If the length of the screw changes, accessories such as a barrel and a heater are forced to be changed, so that a large amount of labor for the operation for adjusting the kneading degree of the raw material is required.

In addition, it is undeniable that the longer the entire length of the screw, the more troublesome the formation of the flight and the hole, and, at the same time, the more complex the configuration of the screw. Accordingly, there is a problem that the manufacturability, maintenance, management, and so on of the screw are not easy.

A first object of the present invention is to obtain a screw for an extruder in which the shear action or the elongation action applied to a raw material can be easily changed or adjusted, which has a simple structure, and in which productivity, maintenance, and management are easy.

A second object of the present invention is to obtain a screw element which has a simple structure and in which a passage for applying the elongation action to a raw material can be easily formed.

A third object of the present invention is to obtain an extruder and an extrusion method which can easily change or adjust the shear action or the elongation action applied to a raw material and can form a kneaded material obtained by suitably kneading the raw material.

BRIEF SUMMARY OF THE INVENTION

In order to achieve the above object, a screw for an extruder according to one embodiment of the present invention is provided with a screw main body which rotates around a linear axis line along a conveyance direction of a raw material, a conveyance portion which is provided on an outer peripheral surface along a circumferential direction of the screw main body and has a flight conveying the raw material in an axial direction of the screw main body when the screw main body rotates, and a passage of the screw main body. The passage includes a first passage element into which the raw material conveyed by the flight flows, a second passage element through which the raw material flowing in from the first passage element flows, and a third passage element through which the raw material having flown through the second passage element returns to the outer peripheral surface of the screw main body.

The screw main body has a rotating shaft provided coaxially with the axis line and a plurality of cylindrical bodies coaxially inserted into the outer peripheral surface of the rotating shaft so as to rotate following the rotating shaft and arranged in the axial direction of the rotating shaft. At least a portion of the conveyance portion is formed on the outer peripheral surfaces of the cylindrical bodies adjacent to each other on the rotating shaft, and the passage is formed in the cylindrical body so as to cross over between the adjacent cylindrical bodies.

In order to achieve the above object, the screw for an extruder according to one embodiment of the present invention is provided with a screw main body which has a linear axis line along a conveyance direction of a raw material and rotates around the axis line, a conveyance portion which is provided on an outer peripheral surface along a circumferential direction of the screw main body and has a flight conveying the raw material in an axial direction of the screw main body when the screw main body rotates, and a passage of the screw main body. The passage includes an inlet into which the raw material conveyed by the flight flows, a passage main body through which the raw material flowing in from the inlet flows, and an outlet through which the raw material having flown through the passage main body returns to the outer peripheral surface of the screw main body.

The screw main body has a rotating shaft provided coaxially with the axis line and a plurality of cylindrical bodies coaxially inserted into the outer peripheral surface of the rotating shaft so as to rotate following the rotating shaft and arranged in the axial direction of the rotating shaft. At least a portion of the conveyance portion is formed on the outer peripheral surface of at least one of the cylindrical bodies, and the passage is formed in the at least one of the cylindrical bodies.

In order to achieve the above object, a screw element according to one embodiment of the present invention is configured to be coaxially inserted into an outer peripheral surface of a rotating shaft of a screw for an extruder and rotate integrally with the rotating shaft.

The screw element has an outer peripheral surface provided with a flight conveying a raw material, at least one of an inlet into which the raw material flows and an outlet to which the raw material returns is provided at a place of the outer peripheral surface deviated from the flight, and the screw element includes a passage which communicates with at least one of the inlet and the outlet and through which the raw material circulates.

In order to achieve the above object, an extruder according to one embodiment of the present invention is an extruder which produces a kneaded material by kneading a raw material with the screw and includes a barrel in which the screw is rotatably contained, a supply port for supplying the raw material to the screw, and a delivery port of the barrel, through which the kneaded material is extruded.

In order to achieve the above object, an extrusion method according to one embodiment of the present invention includes supplying a raw material to the screw rotating in the barrel, continuously conveying the raw material in an axial direction of the screw with the screw, guiding the raw material to the passage of the screw when the screw rotates, and returning the raw material to an outer peripheral surface of the screw through the passage.

BRIEF DESCRIPTION OF THE DRAWINGS

FIG. 6 is a cross-sectional view of the second extruder in which a barrel and a screw are cross-sectioned in the first embodiment.

FIG. 11 is a cross-sectional view of the second extruder schematically showing the flowing direction of the raw material when the screw rotates in the first embodiment.

FIG. 12 is a cross-sectional view schematically showing a variation 1 of a screw main body in the first embodiment.

FIG. 13 is a cross-sectional view schematically showing a variation 2 of the screw main body in the first embodiment.

FIG. 14A is an enlarged cross-sectional view of a portion F14A of FIG. 13.

FIG. 14B is a cross-sectional view along a line F14B-F14B in FIG. 14A.

FIG. 18 is a cross-sectional view schematically showing a variation 5 of the screw main body in the first embodiment.

FIG. 19 is a cross-sectional view of a second extruder used in a second embodiment.

FIG. 28 is a side view of the screw used in the third embodiment.

FIG. 31 is an enlarged cross-sectional view of the second extruder showing a state in which a passage is formed crossing over among three cylindrical bodies adjacent on a rotating shaft in the third embodiment.

FIG. 32 is a side view of the screw showing a flowing direction of a raw material when the screw rotates in the third embodiment.

DETAILED DESCRIPTION OF THE INVENTION

First Embodiment

Hereinafter, the first embodiment will be described with reference to FIGS. 1 to 11.

Figure 1:
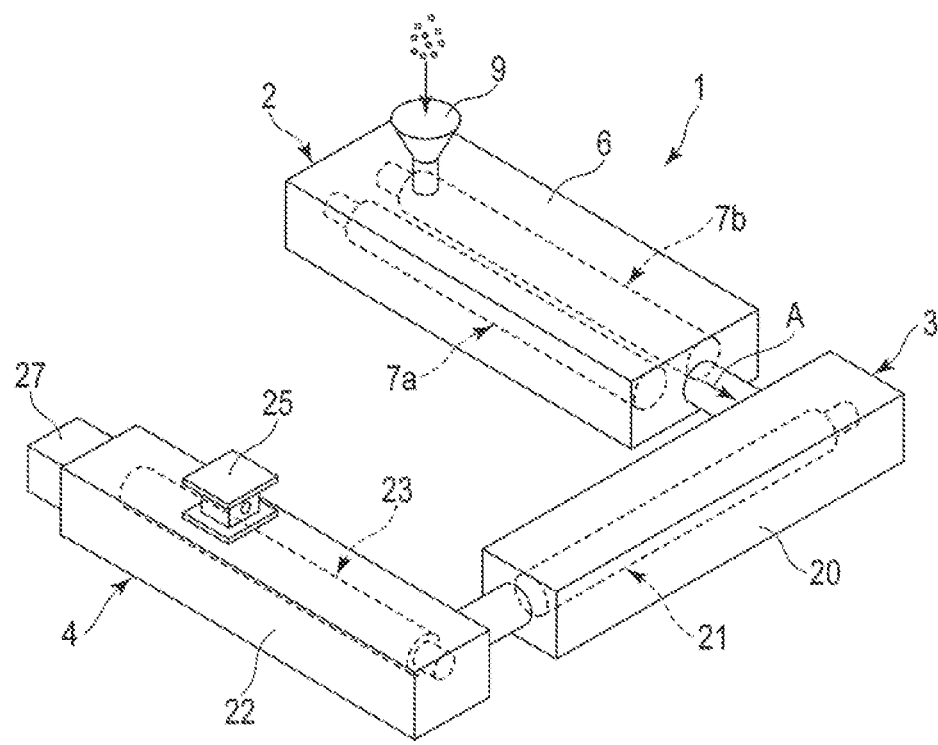
FIG. 1 is a perspective view schematically showing a continuous high shear processing device according to a first embodiment.

FIG. 1 schematically showing a configuration of a continuous high shear processing device 1 according to the first embodiment. The high shear processing device 1 includes a first extruder 2, a second extruder 3, and a third extruder 4. The first extruder 2, the second extruder 3, and the third extruder 4 are connected in series to each other.

The first extruder 2 is an element for preliminarily kneading two kinds of incompatible resins, for example. As resins to be blended, a methacrylate resin, such as polymethylmethacrylate (PMMA), and a polycarbonate resin (PC) are used. Two kinds of resins to be blended are supplied to the first extruder 2 while being in a pelletized state, for example.

In the present embodiment, in order to enhance a degree of kneading/melting a resin, a co-rotating twin-screw extruder is used as the first extruder 2.

Figure 2:
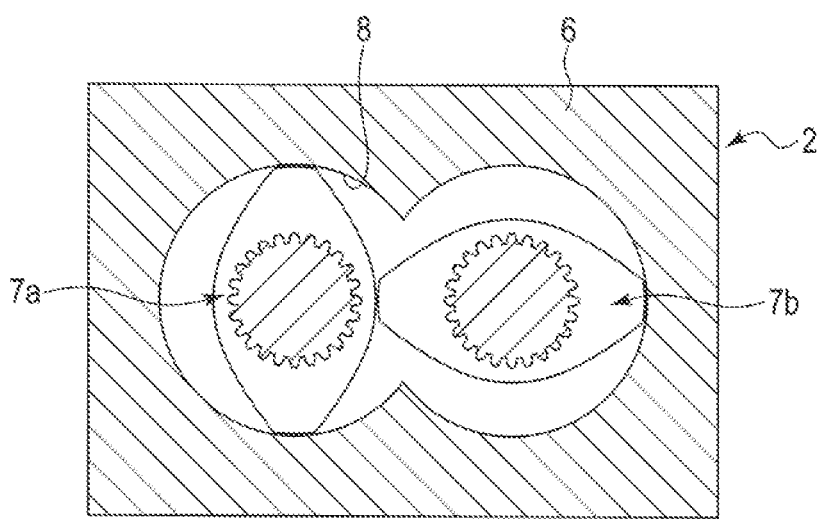
FIG. 2 is a cross-sectional view of a first extruder used in the first embodiment.
Figure 3:
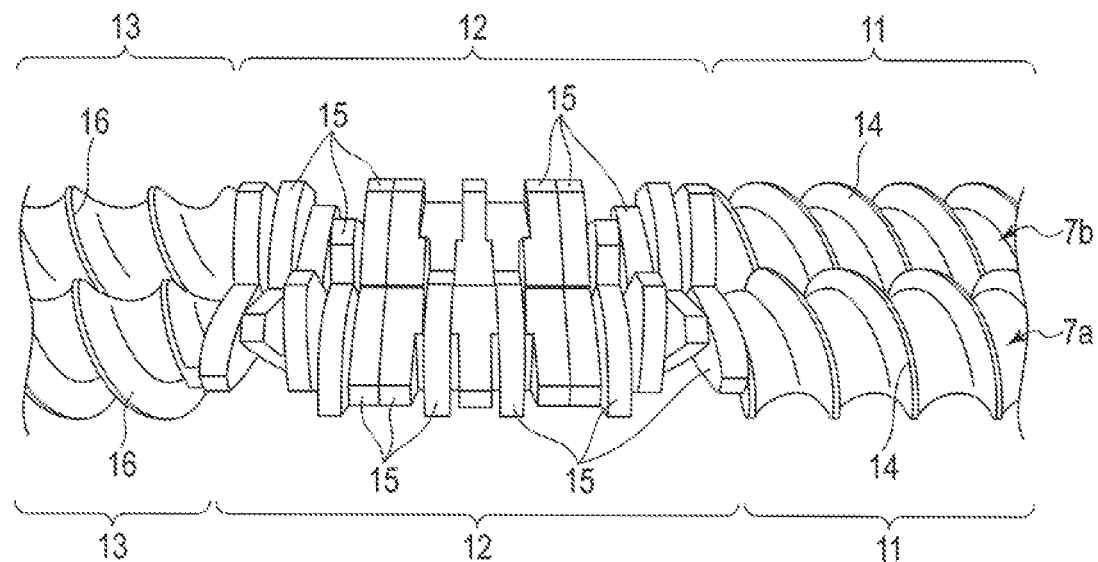
FIG. 3 is a perspective view showing a state in which two screws of the first extruder mesh with each other in the first embodiment.

FIGS. 2 and 3 disclose one example of a twin-screw extruder. The twin-screw extruder includes a barrel 6 and two screws 7a and 7b contained in the barrel 6. The barrel 6 includes a cylinder portion 8 having a shape in which two cylinders are combined. The resin is continuously supplied to the cylinder portion 8 from a supply port 9 provided at one end of the barrel 6. The barrel 6 includes a heater for heating the cylinder portion 8.

The screws 7a and 7b are contained in the cylinder portion 8 while being in a state of meshing with each other. The screws 7a and 7b receive torque transmitted from a motor (not shown) to be rotated in the same direction. As shown in FIG. 3, the screws 7a and 7b each include a feed portion 11, a kneading portion 12, and a pumping portion 13. The feed portion 11, the kneading portion 12, and the pumping portion 13 are arranged in a line along the axial directions of the screws 7a and 7b.

The feed portion 11 has a spirally twisted flight 14. The flights 14 of the screws 7a and 7b rotate in a state of meshing with each other and, at the same time, convey the two kinds of resins, supplied from the supply port 9, toward the kneading portion 12.

The kneading portion 12 has a plurality of disks 15 arranged in the axial directions of the screws 7a and 7b. The disks 15 of the screws 7a and 7b rotate in a state of facing each other and, at the same time, preliminarily knead the resin sent from the feed portion 11. The kneaded resin is sent into the pumping portion 13 by the rotation of the screws 7a and 7b.

The pumping portion 13 has a spirally twisted flight 16. The flights 16 of the screws 7a and 7b rotate in a state of meshing with each other and, at the same time, extrude the preliminarily kneaded resin from a delivery end of the barrel 6.

According to such a twin-screw extruder, the resin supplied to the feed portions 11 of the screws 7a and 7b receives shear heat generation accompanying the rotation of the screws 7a and 7b and heat from the heater to be melted. The resin melted by preliminarily kneading in the twin-screw extruder constitutes a blended raw material. The raw material is continuously supplied from the delivery end of the barrel 6 to the second extruder 3, as shown by the arrow A in FIG. 1.

At the time of supplying the raw material to the second extruder 3, the raw material is melted by preliminarily kneading in the first extruder 2 and has a flowability. Accordingly, it is possible to reduce the burden on the second extruder 3 which fully kneads the raw material.

The second extruder 3 is an element for producing a kneaded material having a microscopic dispersion structure in which a polymer component of the raw material is nano-dispersed. In this embodiment, a single screw extruder is used as the second extruder 3. The single screw extruder includes a barrel 20 and a screw 21. The screw 21 has a function of repeatedly applying the shear action and the elongation action to a melted raw material. The configuration of the second extruder 3 including the screw 21 will be described in detail later.

Figure 4:
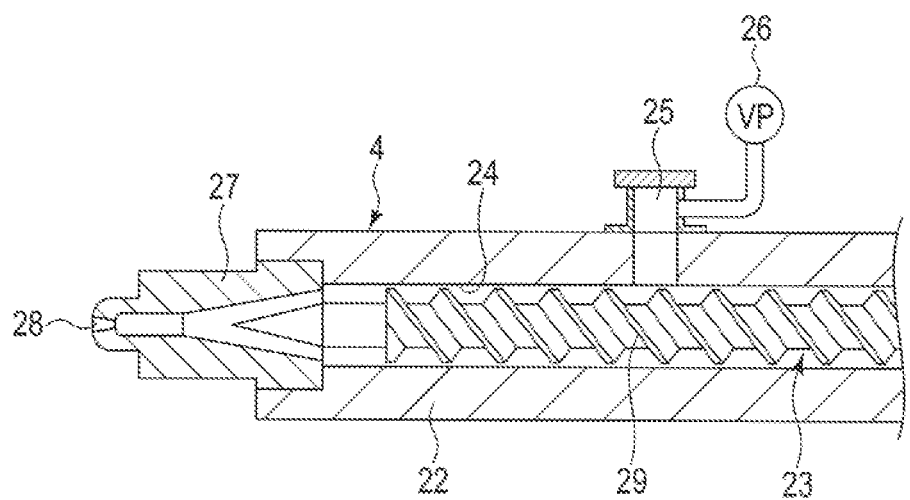
FIG. 4 is a cross-sectional view of a third extruder used in the first embodiment.

The third extruder 4 is an element for removing a gas component contained in a kneaded material extruded from the second extruder 3. In this embodiment, a single screw extruder is used as the third extruder 4. As shown in FIG. 4, the single screw extruder includes a barrel 22 and a vent screw 23 contained in the barrel 22. The barrel 22 includes a straight cylindrical cylinder portion 24. The kneaded material extruded from the second extruder 3 is continuously supplied to the cylinder portion 24 from one end along the axial direction of the cylinder portion 24.

The barrel 22 has a vent port 25. The vent port 25 is opened in an intermediate portion along the axial direction of the cylinder portion 24 and connected to a vacuum pump 26. The other end of the cylinder portion 24 of the barrel 22 is closed by a head portion 27. The head portion 27 has a delivery port 28 through which a kneaded material is delivered.

The vent screw 23 is contained in the cylinder portion 24. The vent screw 23 receives torque transmitted from a motor (not shown) to be rotated in one direction. The vent screw 23 has a spirally twisted flight 29. The flight 29 rotates integrally with the vent screw 23 and, at the same time, continuously conveys a kneaded material, supplied to the cylinder portion 24, toward the head portion 27.

The kneaded material receives vacuum pressure of the vacuum pump 26 when conveyed to a position corresponding to the vent port 25. Consequently, gaseous substances and other volatile components contained in the kneaded material are continuously removed from the kneaded material. The kneaded material free from the gaseous substances and other volatile components is continuously delivered outside the high shear processing device 1 from the delivery port 28 of the head portion 27.

Next, the second extruder 3 will be described in detail.

Figure 5:
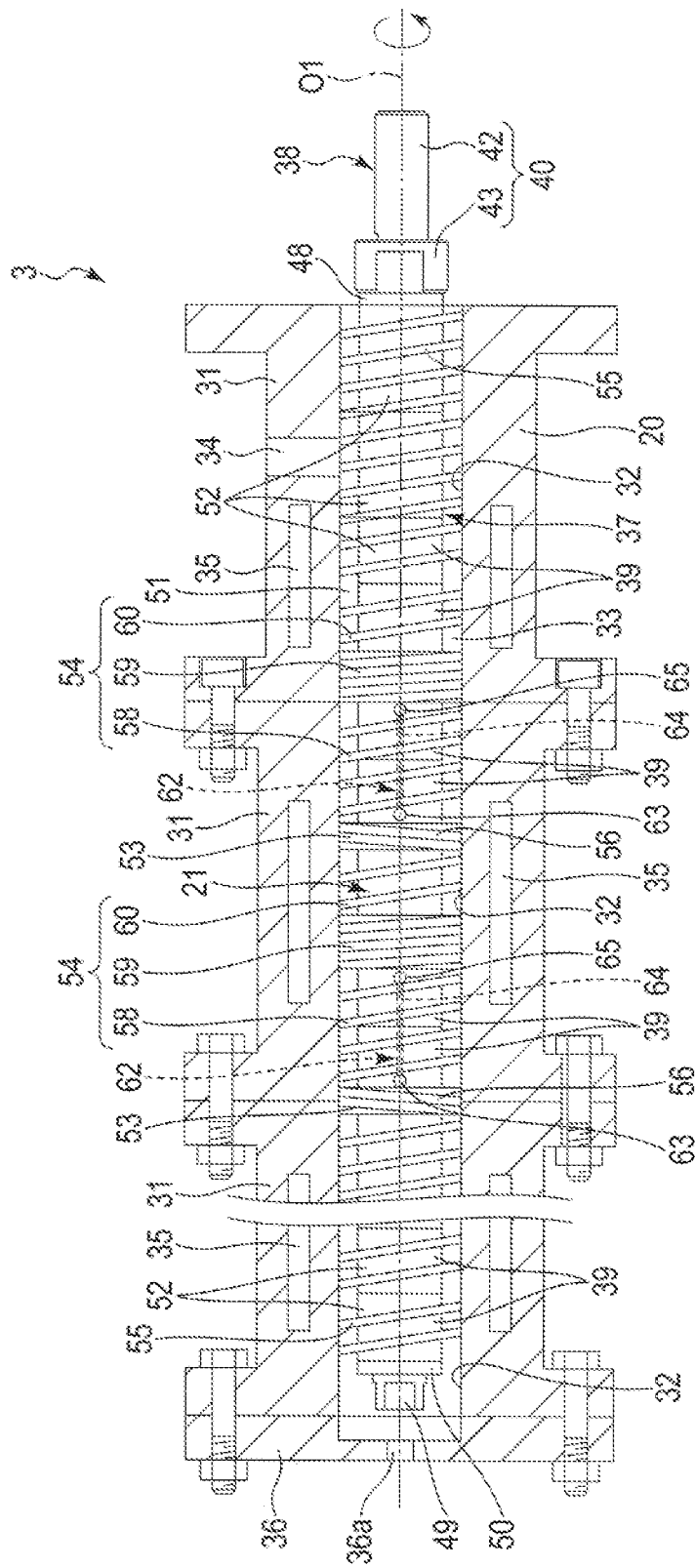
FIG. 5 is a cross-sectional view of a second extruder used in the first embodiment.

As shown in FIGS. 5 and 6, the barrel 20 of the second extruder 3 is straight and cylindrical and is horizontally disposed. The barrel 20 is divided into a plurality of barrel elements 31.

Each of the barrel elements 31 has a cylindrical through-hole 32. In the barrel element 31, the through-holes 32 are integrally connected so as to continue coaxially. The through-holes 32 of the barrel elements 31 cooperate with each other to specify the cylindrical cylinder portion 33 in the barrel 20. The cylinder portion 33 extends in the axial direction of the barrel 20.

A supply port 34 is formed at one end along the axial direction of the barrel 20. The supply port 34 communicates with the cylinder portion 33 and, at the same time, the raw material blended in the first extruder 2 is continuously supplied to the supply port 34.

The barrel 20 includes a heater (not shown). The heater adjusts the temperature of the barrel 20 such that the temperature of the barrel 20 has a value optimum for kneading the raw material. The barrel 20 further includes a refrigerant passage 35 through which a refrigerant such as water or oil flows. The refrigerant passage 35 is disposed to surround the cylinder portion 33. When the temperature of the barrel 20 exceeds a predetermined upper limit value, the refrigerant flows along the refrigerant passage 35 to forcibly cool the barrel 20.

The other end along the axial direction of the barrel 20 is closed by a head portion 36. The head portion 36 has a delivery port 36a. The delivery port 36a is located on the opposite side along the axial direction of the barrel 20 with respect to the supply port 34 and, at the same time, connected to the third extruder 4.

Figure 7:
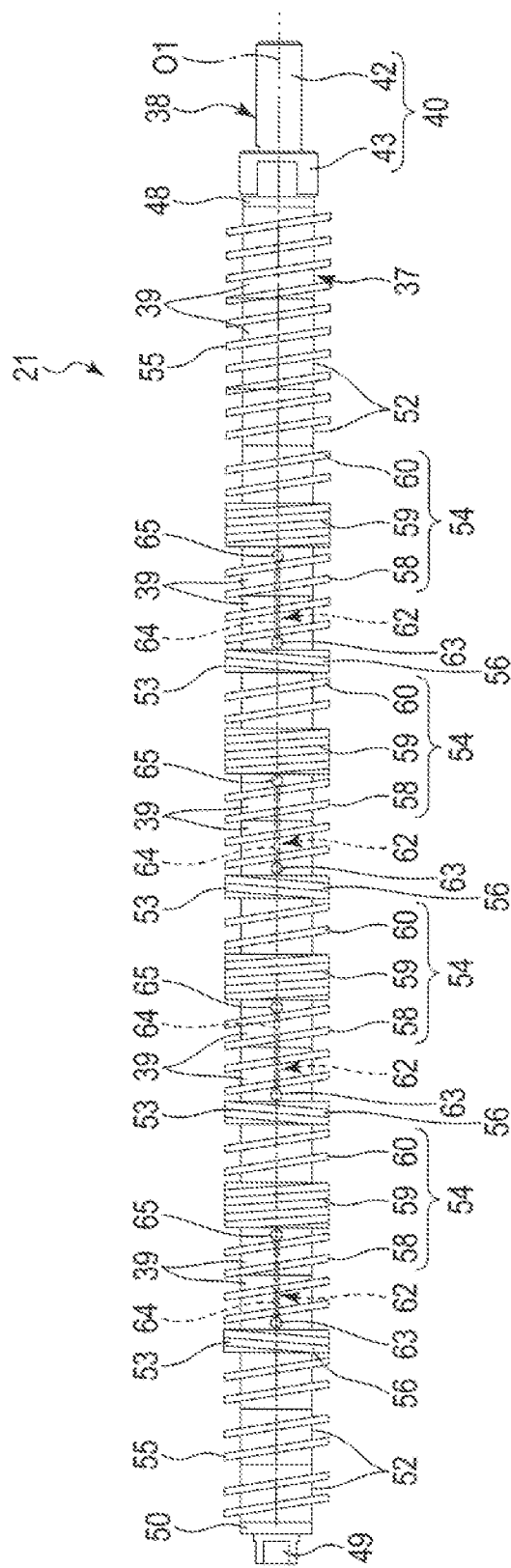
FIG. 7 is a side view of the screw used in the first embodiment.

As shown in FIGS. 5 to 7, the screw 21 includes a screw main body 37. The screw main body 37 of this embodiment is constituted of a rotating shaft 38 and a plurality of cylindrical bodies 39.

The rotating shaft 38 includes a first shaft portion 40 and a second shaft portion 41. The first shaft portion 40 is located at a base end of the rotating shaft 38 as the side of one end of the barrel 20. The first shaft portion 40 includes a joint portion 42 and a stopper portion 43. The joint portion 42 is coupled to a drive source, such as a motor, through a coupling (not show). The stopper portion 43 is provided coaxially with the joint portion 42. The stopper portion 43 has a larger diameter than the joint portion 42.

The second shaft portion 41 coaxially extends from an end surface of the stopper portion 43 of the first shaft portion 40. The second shaft portion 41 has a length over substantially the entire length of the barrel 20 and has a distal end facing the head portion 36. A straight axis line O1 coaxially penetrating through the first shaft portion 40 and the second shaft portion 41 horizontally extends in the axial direction of the rotating shaft 38. Accordingly, the screw main body 37 is provided coaxially with respect to the axis line O1.

Figure 8:
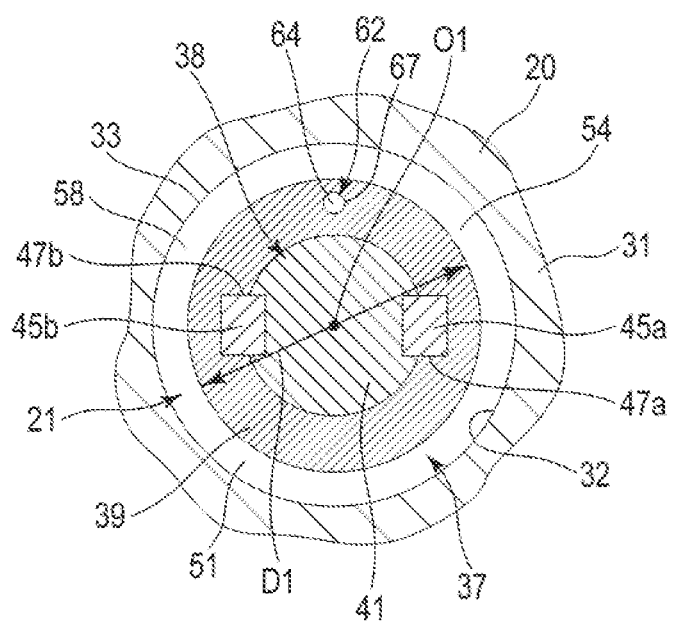
FIG. 8 is a cross-sectional view along a line F8-F8 in FIG. 6.

The second shaft portion 41 is a solid columnar element having a smaller diameter than the stopper portion 43. As shown in FIG. 8, a pair of keys 45a and 45b is attached to an outer peripheral surface of the second shaft portion 41. The keys 45a and 45b extend in the axial direction of the second shaft portion 41 at a position deviated by 180° in a circumferential direction of the second shaft portion 41.

As shown in FIGS. 6 to 9, the cylindrical body 39 is an element defining an outer diameter of the screw main body 37 and is coaxially inserted onto the second shaft portion 41. According to this embodiment, outer diameters D1 of all the cylindrical bodies 39 are set to be the same.

The cylindrical body 39 has end surfaces 39a at both ends along the axial direction. The end surface 39a is a flat surface along a direction perpendicular to the axis line O1. A pair of key grooves 47a and 47b is formed on an inner peripheral surface of the cylindrical body 39. The key grooves 47a and 47b extend in the axial direction of the cylindrical body 39 at a position deviated by 180° in a circumferential direction of the cylindrical body 39 and, at the same time, are opened in the both end surfaces 39a of the cylindrical body 39.

The cylindrical body 39 is inserted onto the second shaft portion 41 from a direction of the distal end of the second shaft portion 41 in such a state that the key grooves 47a and 47b correspond to the keys 45a and 45b of the second shaft portion 41. In this embodiment, a first collar 48 is interposed between the cylindrical body 39 initially inserted onto the second shaft portion 41 and the end surface of the stopper portion 43 of the first shaft portion 40. A second collar 50 is fixed to a distal end surface of the second shaft portion 41 through a fixing screw 49 in such a state that all the cylindrical bodies 39 are inserted onto the second shaft portion 41.

The fixing screw 49 is one example of a fastener, and the second collar 50 is one example of an end plate. When the second collar 50 is fixed to the distal end surface of the second shaft portion 41, all the cylindrical bodies 39 are fastened between the first collar 48 and the second collar 50 in the axial direction of the second shaft portion 41. According to this constitution, the end surfaces 39a of the adjacent cylindrical bodies 39 are firmly adhered with no space between.

As a result, all the cylindrical bodies 39 are coaxially connected on the second shaft portion 41, and the segmental screw main body 37 having a constant outer diameter is configured. At the same time, the rotating shaft 38 and the cylindrical bodies 39 are assembled as an integral structure, so that the cylindrical bodies 39 rotate around the axis line O1 so as to follow the rotating shaft 38.

In this embodiment, the cylindrical body 39 is not limited to be fixed to the rotating shaft 38 by the keys 45a and 45b. For example, instead of the keys 45a and 45b, the cylindrical body 39 may be fixed to the rotating shaft 38 with the use of a spline shown in FIG. 2.

The screw 21 is contained in the cylinder portion 33 of the barrel 20. The screw main body 37 of the screw 21 is located coaxially with respect to the cylinder portion 33, and a conveyance path 51 is formed between an outer peripheral surface of the screw main body 37 and an inner peripheral surface of the cylinder portion 33. As shown in FIG. 8, the conveyance path 51 has an annular cross-sectional shape along the radial direction of the cylinder portion 33 and extends in the axial direction of the cylinder portion 33. The joint portion 42 and the stopper portion 43 of the rotating shaft 38 protrude outside the barrel 20 from one end of the barrel 20.

In this embodiment, as the screw 21 is viewed from the direction of the base end of the rotating shaft 38, the screw 21 receives torque from the drive source to rotate to the left in a counterclockwise direction as shown by the arrow in FIG. 5. The rotation speed of the screw 21 is preferably 600 rpm to 3000 rpm.

As shown in FIGS. 5 to 7, the screw main body 37 has a plurality of conveyance portions 52 conveying the raw material, a plurality of barrier portions 53 limiting flow of the raw material, and a plurality of circulation portions 54 temporarily circulating the raw material. The conveyance portions 52, the barrier portions 53, and the circulation portions 54 are arranged in a row in the axial direction of the screw main body 37. The axial direction of the screw main body 37 can be paraphrased as a longitudinal direction of the screw main body 37.

Each of the conveyance portions 52 has a spirally twisted flight 55. The flight 55 extends from the outer peripheral surface along the circumferential direction of the cylindrical body 39 toward the conveyance path 51. When the screw 21 rotates to the left, the flight 55 is twisted to convey the raw material from the base end of the screw main body 37 toward the leading end thereof. In other words, in the flight 55, the twisting direction of the flight 55 is twisted to the right as in a right screw.

In this embodiment, the conveyance portions 52 are continuously arranged at each of the base and leading ends of the screw main body 37. The supply port 34 of the barrel 20 faces an intermediate portion along the axial direction of one of the conveyance portions 52 at the base end of the screw main body 37.

The length of the conveyance portion 52 along the axial direction of the screw main body 37 is suitably set according to the kind of the raw material, the kneading degree of the raw material, and production of the kneaded material per unit time, for example. Although the conveyance portion 52 is a region where the flight 55 is formed on at least the outer peripheral surface of the cylindrical body 39, the region is not specified by a region between a starting point and an ending point of the flight 55.

In other words, a region of the outer peripheral surface of the cylindrical body 39 deviated from the flight 55 is sometimes regarded as the conveyance portion 52. Further, when a cylindrical spacer or a cylindrical collar is disposed at a position adjacent to the cylindrical body 39 having the flight 55, the spacer or the collar may be included in the conveyance portion 52.

The barrier portions 53 are arranged at an intermediate portion between the base and leading ends of the screw main body 37 at intervals in the axial direction of the screw main body 37. The barrier portion 53 has a spirally twisted flight 56. The flight 56 extends from the outer peripheral surface along the circumferential direction of the cylindrical body 39 toward the conveyance path 51.

When the screw 21 rotates to the left, the flight 56 is twisted to convey the raw material from the leading end of the screw main body 37 toward the base end thereof. In other words, in the flight 56, the twisting direction of the flight 56 is twisted to the left as in a left screw. The pitch of the flight 56 of the barrier portion 53 is the same as the pitch of the flight 55 of the conveyance portion 52 or smaller than the pitch of the flight 55.

The entire length of the barrier portion 53 along the axial direction of the screw main body 37 is shorter than the entire length of the conveyance portion 52. In addition, a clearance between the top of the flight 56 and the inner peripheral surface of the cylinder portion 33 is slightly smaller than a clearance between the top of the flight 55 and the inner peripheral surface of the cylinder portion 33.

The length of the barrier portion 53 along the axial direction of the screw main body 37 is suitably set according to the kind of the raw material, the kneading degree of the raw material, and the production of the kneaded material per unit time, for example. The barrier portion 53 functions to dam the flow of the raw material sent by the conveyance portion 52. Namely, the barrier portion 53 is adjacent to the conveyance portion 52 on the downstream side in the conveyance direction of the raw material and is configured to prevent the raw material sent by the conveyance portion 52 from passing through the clearance between the top of the flight 56 and the inner peripheral surface of the cylinder portion 33.

The circulation portion 54 is adjacent to the barrier portion 53 from the direction of the base end of the rotating shaft 38. Each of the circulation portions 54 has first to third spirally twisted flights 58, 59, and 60. In this embodiment, the first flight 58, the second flight 59, and the third flight 60 are arranged in this order from the barrier portion 53 toward the base end of the screw main body 37.

Figure 9:
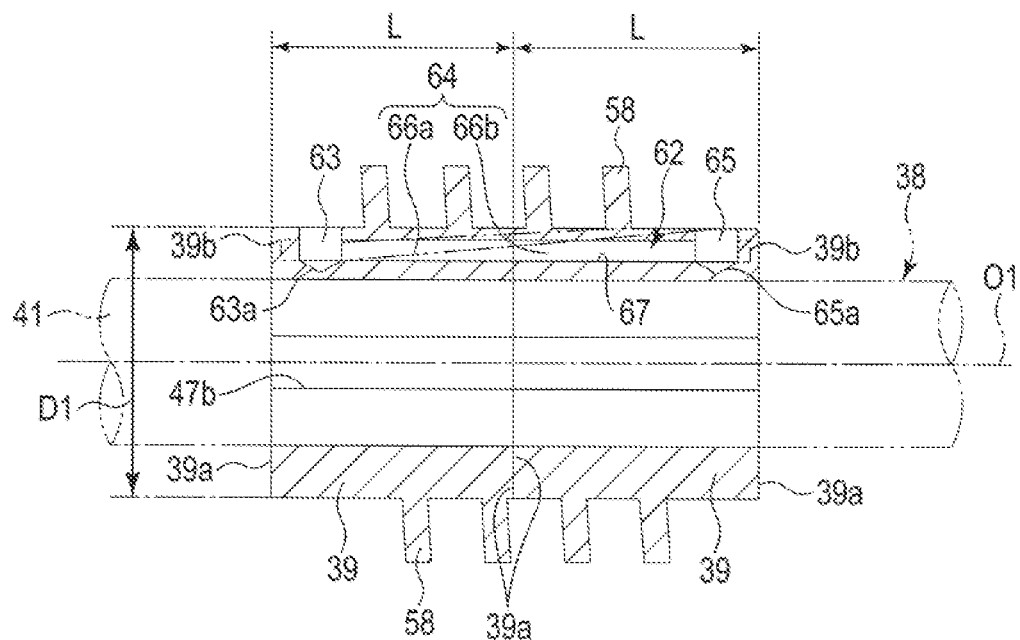
FIG. 9 is a cross-sectional view schematically showing a state in which a passage is formed crossing over between two cylindrical bodies adjacent to each other on a rotating shaft in the first embodiment.
Figure 10:
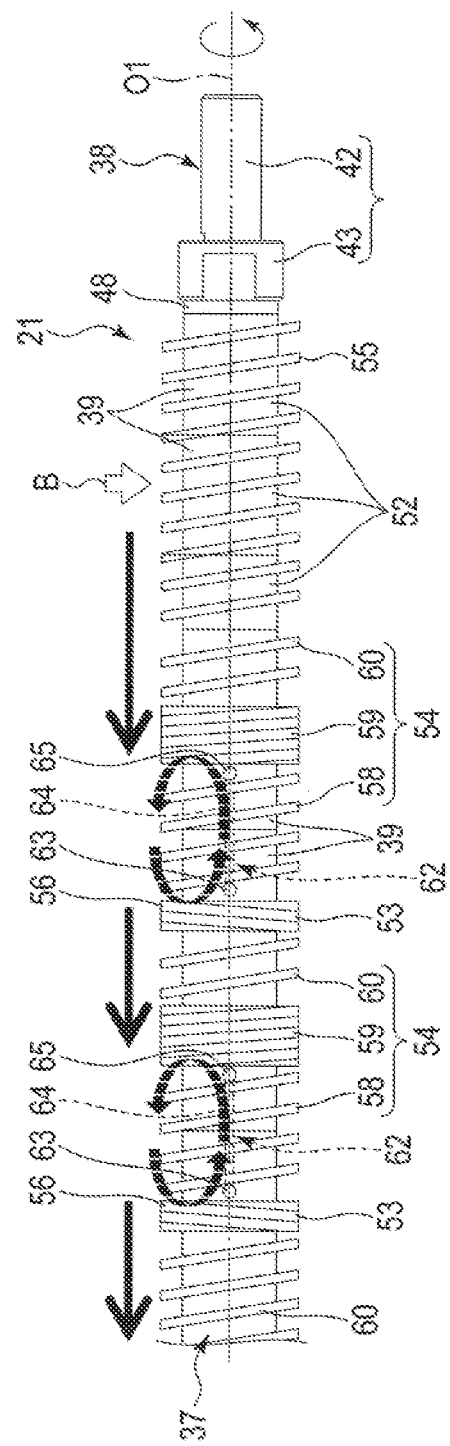
FIG. 10 is a side view of the screw showing a flowing direction of the raw material when the screw rotates in the first embodiment.
Figure 15A:
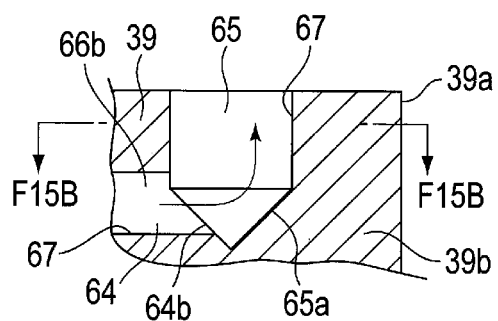
FIG. 15A is an enlarged cross-sectional view of a portion F15A of FIG. 13.
Figure 15B:
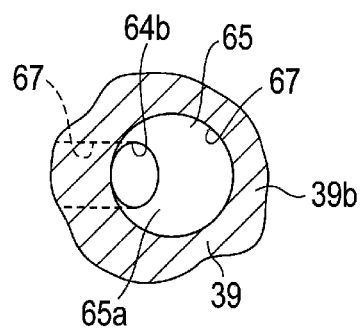
FIG. 15B is a cross-sectional view along a line F15B-F15B in FIG. 15A.

The first to third flights 58, 59, and 60 each extend from the outer peripheral surface along the circumferential direction of the cylindrical body 39 toward the conveyance path 51. In particular, the first flight 58 is formed crossing over between the two cylindrical bodies 39 adjacent to each other on the rotating shaft 38. As shown in FIG. 9, in the cylindrical bodies 39 formed with the first flights 58, lengths L along the axial direction of the rotating shaft 38 are equal to each other.

The first to third flights 58, 59, and 60 are continuously arranged in the axial direction of the screw main body 37 and are twisted to convey the raw material from the base end of the screw main body 37 toward the leading end thereof when the screw 21 rotates to the left. In other words, in the first to third flights 58, 59, and 60, each twisting direction is twisted to the right as in a right screw.

The pitch of the first flight 58 is the same as the pitch of the flight 56 of the adjacent barrier portion 53 or smaller than the pitch of the flight 56. The pitch of the second flight 59 is smaller than the pitch of the first flight 58. The pitch of the third flight 60 is larger than the pitch of the second flight 59. A slight clearance is secured between the tops of the first to third flights 58, 59, and 60 and the inner peripheral surface of the cylinder portion 33.

According to the screw 21 of this embodiment, the flights 55, 56, 58, 59, and 60 extend from the outer peripheral surfaces of the cylindrical bodies 39 having the same outer diameter D1 toward the conveyance path 51. Thus, the outer peripheral surface of the cylindrical body 39 defines a root diameter of the screw 21. The root diameter of the screw 21 is maintained at a constant value over the entire length of the screw 21.

As shown in FIGS. 5 to 9, the screw main body 37 has a plurality of passages 62 extending in the axial direction of the screw main body 37. The passages 62 are provided at positions corresponding to the first flights 58 of the circulation portions 54 and arranged at intervals from each other in the axial direction of the screw main body 37.

Each of the passages 62 is formed in the two cylindrical bodies 39, formed with the first flights 58, to cross over between the two cylindrical bodies 39. More specifically, as shown in FIGS. 6 and 9, each of the passages 62 is specified by first to third passage elements 63, 64, and 65.

The first passage element 63 can be paraphrased as an inlet of the passage 62. The first passage element 63 is opened in the outer peripheral surface of the cylindrical body 39 adjacent to the barrier portion 53, among the two adjacent cylindrical bodies 39. An opening end of the first passage element 63 is deviated from the first flight 58 and located immediately before the adjacent barrier portions 53.

The first passage element 63 is formed by machining the outer peripheral surface of one of the cylindrical bodies 39 with the use of a drill, for example. Thus, the first passage element 63 is a hole having a circular cross-sectional shape and extends from the outer peripheral surface of one of the cylindrical bodies 39 in the radial direction of the cylindrical body 39 so as to be perpendicular to the axis line O1. A bottom 63a of the first passage element 63 is an inclined surface shaved off into the shape of a cone by the tip of the drill.

The second passage element 64 can be paraphrased as a passage main body through which the raw material circulates. As shown in FIG. 9, the second passage element 64 extends parallel to the axis line O1 of the screw main body 37 to cross over between the two adjacent cylindrical bodies 39. Accordingly, the second passage element 64 is linearly provided in the axial direction of the screw main body 37 without being branched on its way and has a predetermined entire length.

As best shown in FIG. 9, the second passage element 64 includes a first portion 66a formed in one of the cylindrical bodies 39 and a second portion 66b formed in the other cylindrical body 39. The first portion 66a of the second passage element 64 linearly extends in the axial direction of one of the cylindrical bodies 39 and is opened in the end surface 39a of the cylindrical body 39 on the other cylindrical body 39 side. An end on the opposite side of the opening end of the first portion 66a is closed by an end wall 39b of one of the cylindrical bodies 39. The end wall 39b is located on the opposite side of the opening end of the first portion 66a.

According to this embodiment, the first portion 66a of the second passage element 64 is formed by machining one of the cylindrical bodies 39 from the side of the end surface 39a of the cylindrical body 39 with the use of a drill, for example. Thus, the first portion 66a is specified by a hole having a circular cross-sectional shape.

The second portion 66b of the second passage element 64 linearly extends in the axial direction of the other cylindrical body 39 and is opened in the end surface 39a of the cylindrical body 39 on the one cylindrical body 39 side. An end on the opposite side of the opening end of the second portion 66b is closed by the end wall 39b of the other cylindrical body 39. The end wall 39b is located on the opposite side of the opening end of the second portion 66b.

According to this embodiment, the second portion 66b of the second passage element 64 is formed by machining the other cylindrical body 39 from the side of the end surface 39a of the cylindrical body 39 with the use of a drill, for example. Thus, the second portion 66b is specified by a hole having a circular cross-sectional shape as in the first portion 66a.

The opening end of the first portion 66a and the opening end of the second portion 66b are coaxially butt-joined so as to communicate with each other when the two adjacent cylindrical bodies 39 are fastened in the axial direction of the rotating shaft 38.

The third passage element 65 can be paraphrased as an outlet of the passage 62. The third passage element 65 is opened in the outer peripheral surface of the other one of the two adjacent cylindrical bodies 39. An opening end of the third passage element 65 is deviated from the first flight 58 and located immediately before the second flight 59 of the circulation portion 54. Accordingly, the first passage element 63 and the third passage element 65 are away from each other in the axial direction of the screw main body 37.

In this embodiment, the third passage element 65 is formed by machining the outer peripheral surface of the other cylindrical body 39 with the use of a drill, for example. Thus, the third passage element 65 is a hole having a circular cross-sectional shape and extends from the outer peripheral surface of the other cylindrical body 39 in the radial direction of the cylindrical body 39. A bottom 65a of the third passage element 65 is an inclined surface shaved off into the shape of a cone by the tip of the drill.

As shown in FIG. 9, an end on the opposite side of the opening end of the first portion 66a of the second passage element 64 is connected to the first passage element 63 in one of the cylindrical bodies 39. The first passage element 63 and the first portion 66a of the second passage element 64 communicate with each other while maintaining their circular cross-sectional shapes. The first portion 66a of the second passage element 64 is connected to the first passage element 63 at a position deviated from the conical bottom 63a of the first passage element 63.

Thus, the first passage element 63 can be paraphrased as a first rising portion which rises from an end of the first portion 66a of the second passage element 64 in the radial direction of the cylindrical body 39 and is opened in the outer peripheral surface of the screw main body 37.

The first passage element 63 may be communicated with the second passage element 64 at a position shifted toward the opening end of the first portion 66a relative to the end of the first portion 66a of the second passage element 64. In this case, as shown by a two-dot chain line in FIG. 9, the end of the first portion 66a of the second passage element 64 protrudes across the first passage element 63 and toward the end wall 39b of the cylindrical body 39.

The end on the opposite side of the opening end of the second portion 66b of the second passage element 64 is connected to the third passage element 65 in the other cylindrical body 39. The third passage element 65 and the second portion 66b of the second passage element 64 communicate with each other while maintaining their circular cross-sectional shapes. The second portion 66b of the second passage element 64 is connected to the third passage element 65 at a position deviated from the conical bottom 65a of the third passage element 65.

Thus, the third passage element 65 can be paraphrased as a second rising portion which rises from an end of the second portion 66b of the second passage element 64 in the radial direction of the cylindrical body 39 and is opened in the outer peripheral surface of the screw main body 37.

The third passage element 65 may be communicated with the second passage element 64 at a position shifted toward the opening end of the second portion 66b relative to the end of the second portion 66b of the second passage element 64. In this case, as shown by the two-dot chain line in FIG. 9, the end of the second portion 66b of the second passage element 64 protrudes across the third passage element 65 and toward the end wall 39b of the cylindrical body 39.

In addition, by virtue of the provision of the passage 62 in the cylindrical body 39, the passage 62 is made eccentric from the axis line O1 of the rotating shaft 38. Thus, the passage 62 is deviated from the axis line O1 and revolves around the axis line O1 when the screw main body 37 rotates.

An inner diameter of a hole constituting the second passage element 64 may be set to not less than 1 mm and less than 6 mm and is preferably not less than 1 mm and not more than 5 mm. An inner diameter of the second passage element 64 is smaller than an inner diameter of the first passage element 63 serving as an inlet. Further, a cross-sectional area along the radial direction of the second passage element 64 is set to be much smaller than a cross-sectional area of the conveyance path 51 along the radial direction of the cylinder portion 33.

According to this embodiment, the cylindrical body 39 has a cylindrical wall surface 67 defining the shape of the hole constituting the first to third passage elements 63, 64, and 65. The wall surface 67 continuously surrounds the first to third passage elements 63, 64, and 65 in the circumferential direction. In other words, the first to third passage elements 63, 64, and 65 surrounded by the wall surface 67 are hollow spaces allowing only circulation of a raw material, and the spaces include no element constituting the screw main body 37. When the screw main body 37 rotates, the wall surface 67 revolves around the axis line O1 without being rotated centering on the axis line O1.

The cylindrical wall surface 67 constituting the first passage element 63 specifies a circular opening at a connecting portion between the first passage element 63 and the outer peripheral surface of the cylindrical body 39. Similarly, the cylindrical wall surface 67 constituting the third passage element 65 specifies a circular opening at a connecting portion between the third passage element 65 and the outer peripheral surface of the cylindrical body 39.

After the cylindrical bodies 39 formed with the first flights 58 are removed from the rotating shaft 38, when the screw 21 is disassembled, the cylindrical body 39 provided with at least one of the first passage element 63 and the third passage element 65 and including the second passage element 64 can be paraphrased as a screw element. Similarly, the cylindrical bodies 39 formed with the other flights 55, 56, 59, and 60 can be paraphrased as screw elements in such a state that the cylindrical bodies 39 are removed from the rotating shaft 38.

According to this continuous high shear processing device 1, the raw material blended in the first extruder 2 and having a flowability is continuously supplied from the supply port 34 of the second extruder 3 to the conveyance path 51. The raw material supplied to the second extruder 3 is introduced to the outer peripheral surface of the conveyance portion 52 located at the base end of the screw main body 37, as shown by the arrow B in FIG. 10.

Since the screw 21 rotates to the left in the counterclockwise direction as the screw 21 is viewed from the direction of the base end of the rotating shaft 38, the flight 55 of the conveyance portion 52 conveys the raw material, introduced from the supply port 34, toward the adjacent circulation portions 54. The first to third flights 58, 59, and 60 of the circulation portion 54 continuously convey the raw material toward the leading end of the screw main body 37, as shown by the solid arrows in FIGS. 10 and 11.

In this case, the shear action occurring due to a speed difference between the flights 55, 58, 59, and 60 revolving in the conveyance path 51 and the inner peripheral surface of the cylinder portion 33 is applied to the raw material, and, at the same time, the raw material is stirred by subtle degrees of twist of the flights 55, 58, 59, and 60. As a result, the raw material is fully kneaded, and dispersion of a polymer component of the raw material is advanced.

The raw material subjected to the shear action reaches a boundary between the circulation portion 54 and the barrier portion 53 along the conveyance path 51. When the screw 21 rotates to the left, since the flight 56 of the barrier portion 53 conveys the raw material from the leading end of the screw main body 37 toward the base end thereof, the flight 56 dams the raw material sent by the first flight 58.

Namely, when the screw 21 rotates to the left, the flight 56 of the barrier portion 53 limits the flow of the raw material sent by the first flight 58 and interferes with passage of the raw material through a clearance between the barrier portion 53 and the inner peripheral surface of the cylinder portion 33.

As a result, the pressure of the raw material is increased at the boundary between the circulation portion 54 and the barrier portion 53. More specifically, FIG. 11 shows the filling rate of the raw material at the places in the conveyance path 51, which correspond to the passage 62, with gradations, and the filling rate of the raw material becomes greater as the tone becomes darker. As seen in FIG. 11, in the conveyance path 51, the filling rate of the raw material becomes greater as it approaches the barrier portion 53 from the second flight 59 of the circulation portion 54, and immediately before the barrier portion 53, the filling rate of the raw material is 100%.

Thus, a raw-material receiver R in which the filling rate of the raw material is 100% is formed immediately before the barrier portion 53. In the raw-material receiver R, the flow of the raw material is dammed, whereby the pressure of the raw material is increased. The raw material whose pressure has been increased flows into the second passage element 64 from the first passage element 63 serving as the inlet of the passage 62, as shown by the dashed arrows in FIGS. 10 and 11. The raw material flowing into the second passage element 64 circulates in the second passage element 64 from the leading end of the screw main body 37 toward the base end thereof. The flowing direction of the raw material in the second passage element 64 faces reversely to the flowing direction of the raw material sent by the flights 55, 58, 59, and 60.

The cross-sectional area along the radial direction of the second passage element 64 is smaller than the cross-sectional area of the conveyance path 51 along the radial direction of the cylinder portion 33. In other words, since the inner diameter of the second passage element 64 is much smaller than the outer diameter of the screw main body 37, when the raw material passes through the second passage element 64, the raw material is rapidly squeezed. Accordingly, the elongation action is applied to the raw material passing through the second passage element 64.

In addition, since the cross-sectional area of the second passage element 64 is satisfactorily smaller than the cross-sectional area of the conveyance path 51, despite the raw material accumulated in the raw-material receiver R flowing into the first passage element 63, the raw-material receiver R immediately before the barrier portion 53 does not disappear.

Thus, even if some variation occurs in the flow volume of the raw material sent toward the barrier portion 53 by the first flight 58, the variation in the flow volume can be absorbed by the raw material accumulated in the raw-material receiver R. Thus, the raw material is supplied to the passage 62 in a stable state at all times.

The raw material having passed through the second passage element 64 is returned onto the outer peripheral surface of the cylindrical body 39, constituting the circulation portion 54, through the third passage element 65 as an outlet. The returned raw material is conveyed toward the barrier portion 53 located in the direction of the leading end of the screw main body 37 by the first flight 58 and is subjected to the shear action again in the process of conveyance.

A portion of the raw material conveyed toward the barrier portion 53 is introduced from the first passage element 63 to the second passage element 64 again, and circulation is temporarily repeated at the place of the circulation portion 54. The remaining raw material conveyed toward the barrier portion 53 passes through the clearance between the top of the flight 56 of the barrier portion 53 and the inner peripheral surface of the cylinder portion 33 to flow into the adjacent circulation portions 54.

According to the screw 21 of this embodiment, the barrier portions 53 and the circulation portions 54 are alternately arranged in the axial direction of the screw main body 37. Further, the passages 62 are arranged at intervals in the axial direction of the screw main body 37 at positions corresponding to the first flights 58 of the circulation portions 54.

Thus, the raw material introduced from the supply port 34 to the screw main body 37 is continuously conveyed without interruption in the direction from the base end of the screw main body 37 to the leading end thereof while being alternately and repeatedly subjected to the shear action and the elongation action. Accordingly, the kneading degree of the raw material is enhanced, and dispersion of a polymer component of the raw material is facilitated.

In this embodiment, the second passage elements 64 of the passages 62 are individually opened in the outer peripheral surface of the screw main body 37 through the first passage elements 63 and the third passage elements 65. Thus, in each of the passages 62, the raw material flowing from the first passage element 63 into the second passage element 64 returns to the outer peripheral surface of the screw main body 37, always through the third passage element 65, so that the raw materials are not mixed with each other between the passages 62.

Accordingly, it is possible to avoid situations where the kneading degree of the raw material becomes excessive, so that appropriate kneading suitable for a desired kneading degree can be achieved.

The raw material having reached the leading end of the screw main body 37 becomes a satisfactorily kneaded material and is introduced into a gap between the cylinder portion 33 and the head portion 36. The kneaded material is continuously supplied from the delivery port 36a of the head portion 36 to the third extruder 4.

In the third extruder 4, as already described, gaseous substances and other volatile components contained in a kneaded material are continuously removed from the kneaded material. The kneaded material free from the gaseous substances and other volatile components is continuously delivered without interruption from the delivery port 28 of the head portion 27 to the outside of the high shear processing device 1. The delivered kneaded material is immersed in cooling water accumulated in a water tank. Consequently, the kneaded material is forcibly cooled, thus obtaining a desired resin molded article.

Since the passage 62 applying the elongation action to the raw material extends in the axial direction of the screw main body 37 at a position eccentric from the axis line O1 serving as a rotation center of the screw main body 37, the passage 62 revolves around the axis line O1. Namely, the cylindrical wall surface 67 specifying the passage 62 revolves around the axis line O1 without being rotated centering on the axis line O1.

Accordingly, when the raw material passes through the passage 62, although the raw material is subjected to centrifugal force, shear force accompanying the rotation of the wall surface 67 on its axis does not act on the raw material. Thus, the raw material returning to the outer peripheral surface of the cylindrical body 39 of the circulation portion 54 through the passage 62 is mainly subjected to the elongation action. As a result, a place where the shear action is applied to the raw material and a place where the elongation action is applied to the raw material are clearly determined, so that the kneading degree of the raw material can be controlled with high accuracy.

Further, since the passages 62 eccentric from the axis line O1 are linearly arranged, the elongation action can be equally applied to the raw material passing through the passages 62. Namely, variation in conditions of kneading between the passages 62 can be eliminated, so that uniform kneading can be performed.

According to the first embodiment, the screw main body 37 of the screw 21 is configured by sequentially inserting the cylindrical bodies 39 having the same outer diameter D1 onto the outer peripheral surface of the rotating shaft 38. The cylindrical bodies 39 have the flights 55, 56, 58, 59, and 60 applying the shear action to the raw material. The two adjacent cylindrical bodies 39 formed with the first flights 58 each have the passage 62 through which the elongation action is applied to the raw material.

Thus, the cylindrical body 39 to be inserted onto the rotating shaft 38 can be freely selected and exchanged according to the kneading degree of the raw material, for example, and the positions of the conveyance portion 52, the barrier portion 53, and the circulation portion 54 can be arbitrarily changed within the range of the length of the screw main body 37. The shapes of the flights 55, 56, 58, 59, and 60 can be easily changed only by operation of exchange of the cylindrical body 39.

In addition, for example when the first flight 58 is locally worn to adversely affect conveyance of the raw material or a physical property thereof, the cylindrical body 39 having the worn first flight 58 may be replaced with a preliminary cylindrical body 39 having a new first flight 58, that is, a screw element. Accordingly, the other cylindrical bodies 39 and the rotating shaft 38 of the screw main body 37 can be repeatedly used, and all components of the screw main body 37 may not be replaced with new ones.

Thus, since it is economical and wear can be corresponded by partial repair of the screw main body 37, a time for stopping the operation of the high shear processing device 1 can be reduced to the minimum necessary.

The passage 62 through which the elongation action is applied to the raw material is formed crossing over between the two cylindrical bodies 39 formed with the first flights 58. Thus, in both of the two cylindrical bodies 39, a relative positional relationship between the first flight 58 and the passage 62 is fixedly determined in both the axial and circumferential directions of the screw main body 37. Accordingly, despite provision of the passage 62 in the screw main body 37, special alignment between the first flight 58 and the passage 62 is not required.

Further, the circulation portion 54 of the screw main body 37 is configured by combining the cylindrical bodies 39 as screw elements. Thus, the passage 62 can be formed at a predetermined position of the circulation portion 54 only by operation of well-regulated insertion of the cylindrical bodies 39 onto the second shaft portion 41 of the rotating shaft 38.

According to the first embodiment, the passage 62 crossing over between the two adjacent cylindrical bodies 39 is formed by fastening the cylindrical bodies 39 in the axial direction of the second shaft portion 41. Namely, when the passage 62 is formed in the screw main body 37, the two cylindrical bodies 39 which are much shorter than the entire length of the screw main body 37 may be machined using a drill, for example. Thus, when the passage 62 is formed, workability and handling of a workpiece are facilitated.

The second passage element 64 of the passage 62 is not necessarily formed parallel to the axis line O1 of the screw main body 37. For example, as shown by the two-dot chain lines in FIGS. 9 and 11, the second passage element 64 is inclined in the radial direction of the cylindrical body 39 with respect to the axis line O1, and an end on the opposite side of the first passage element 63 of the second passage element 64 may be opened directly in the outer peripheral surface of the cylindrical body 39.

According to this constitution, the third passage element 65 serving as an outlet for the raw material can be omitted, and the shape of the passage 62 can be simplified.

Variation 1 of First Embodiment

FIG. 12 shows a variation 1 related to the first embodiment.

In the variation 1 shown in FIG. 12, the two cylindrical bodies 39 formed with the first flights 58 have different lengths 58. More specifically, an entire length L1 of one of the cylindrical bodies 39 formed with the first portion 66a of the second passage element 64 is set to be longer than an entire length L2 of the other cylindrical body 39 formed with the second portion 66b of the second passage element 64.

According to the variation 1, the passage 62 through which a raw material circulates is formed crossing over between the two cylindrical bodies 39 formed with the first flights 58. Thus, in both of the two cylindrical bodies 39, a relative positional relationship between the first flight 58 and the passage 62 is fixedly determined in both the axial and circumferential directions of the screw main body 37.

Accordingly, if the entire lengths L1 and L2 of the two adjacent cylindrical bodies 39 are different from each other, there is no problem when the passage 62 is formed, and similar effects to those of the first embodiment can be obtained.

When two other cylindrical bodies 39 different in length L3 along the axial direction of the rotating shaft 38 are provided in addition to the two cylindrical bodies 39 formed with the first flights 58, the lengths of the two cylindrical bodies 39 having the first flights 58 can be adjusted over three stages. More specifically, it is possible to combine the cylindrical body 39 whose entire length is L1 and the cylindrical body 39 whose entire length is L2, combine the cylindrical body 39 whose entire length is L1 and the cylindrical body 39 whose entire length is L3, combine the cylindrical body 39 whose entire length is L2 and the cylindrical body 39 whose entire length is L3. Thus, the entire length of the passage 62 can be easily changed.

Variation 2 of First Embodiment

FIGS. 13, 14A, 14B, 15A, and 15B show a variation 2 related to the first embodiment.

As shown in FIGS. 13, 14A, and 14B, the end on the opposite side of the opening end of the first portion 66a of the second passage element 64 is connected to the conical bottom 63a of the first passage element 63 so as to be perpendicular to the first passage element 63. The bottom 63a of the first passage element 63 has a circular opening 64a communicating with the second passage element 64. The opening 64a faces other portions of the bottom 63a inclined so as to expand toward the outer peripheral surface of the screw main body 37.

The end on the opposite side of the opening end of the second portion 66b of the second passage element 64 is connected to the conical bottom 65a of the third passage element 65 so as to be perpendicular to the third passage element 65. The bottom 65a of the third passage element 65 has a circular opening 64b communicating with the second passage element 64. The opening 64b faces other portions of the bottom 65a inclined so as to expand toward the outer peripheral surface of the screw main body 37.

According to the variation 2, the raw material flowing into the first passage element 63 is guided in the direction of the opening 64a along the inclination of the bottom 63a of the first passage element 63 once the raw material reaches the bottom 63a, as shown by the arrow in FIG. 14A. Thus, the raw material smoothly flows into the second passage element 64 without accumulated on the bottom 63a of the first passage element 63.

The raw material passing through the second passage element 64 flows into the bottom 65a of the third passage element 65 from the opening 64b. Since the bottom 65a facing the opening 64b is inclined toward the outer peripheral surface of the screw main body 37, the raw material flowing into the third passage element 65 is guided in the direction of the outer peripheral surface of the screw main body 37 along the inclination of the bottom 65a, as shown by the arrow in FIG. 15A. Thus, the raw material smoothly returns to the outer peripheral surface of the screw main body 37 without accumulated on the bottom 65a of the third passage element 65.

Accordingly, local accumulation of the raw material in the passage 62 can be avoided, and a desired elongation action can be applied to the raw material passing through the passage 62.

In the variation 2, the shapes of the bottom 63a of the first passage element 63 and the bottom 65a of the third passage element 65 are not limited to cones. For example, the bottoms 63a and 65a of the first and third passage elements 63 and 65 may be formed into spherical shapes by applying cutting work to the bottoms 63a and 65a.

Variation 3 of First Embodiment

Figure 16:
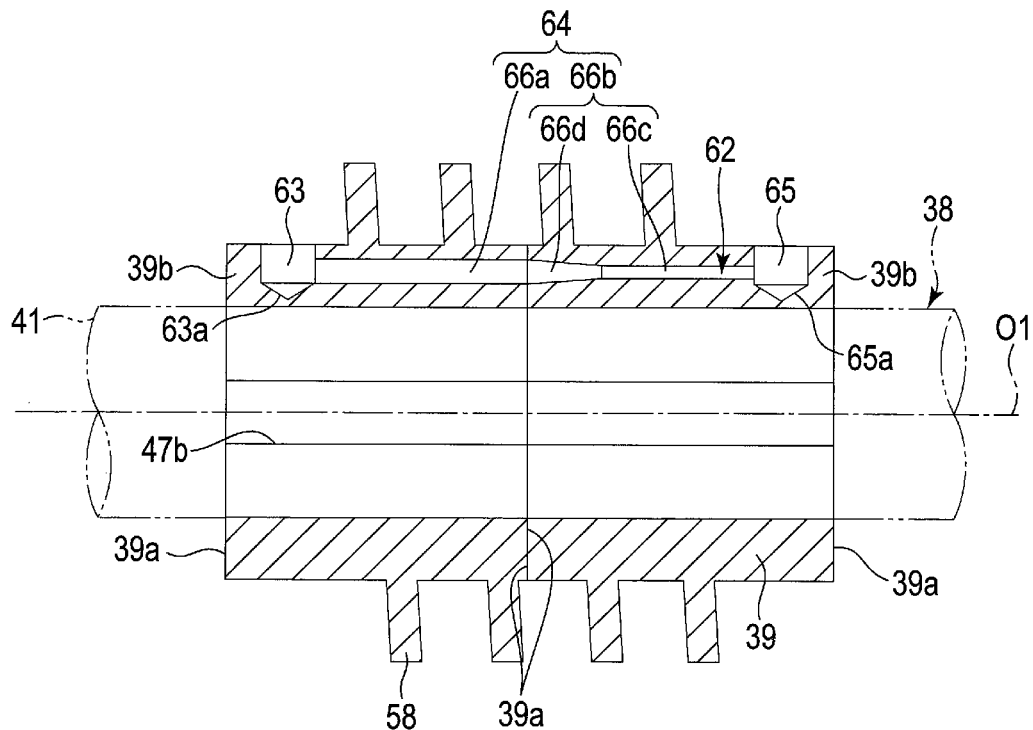
FIG. 16 is a cross-sectional view schematically showing a variation 3 of the screw main body in the first embodiment.

FIG. 16 shows a variation 3 related to the first embodiment.

In the variation 3, the configuration of the second portion 66b of the second passage element 64 is different from that in the first embodiment. As shown in FIG. 16, the second portion 66b has a straight portion 66c and a tapered portion 66d. The straight portion 66c and the tapered portion 66d are formed by applying cutting work to the cylindrical body 39 from the side of the end surface 39a of the cylindrical body 39.

The straight portion 66c is connected to the third passage element 65. An inner diameter of the straight portion 66c is smaller than an inner diameter of the first portion 66a of the second passage element 64. The tapered portion 66d is opened in the end surface 39a of the other one of the cylindrical bodies 39 and coaxially communicates with the straight portion 66c. An inner diameter of the tapered portion 66d is continuously reduced in the direction from the end surface 39a of the other cylindrical body 39 to the straight portion 66c. Thus, the inner diameter of the second passage element 64 as a main element applying the elongation action to a raw material changes at an intermediate portion along the flowing direction of the raw material.

In the formation of the tapered portion 66d, after a prepared hole is formed in the end surface 39a of the other cylindrical body 39, an inner peripheral surface of the prepared hole is cut using a taper reamer, whereby the tapered portion 66d is formed. The prepared hole serves as the straight portion 66c.

According to the variation 3, the second portion 66b of the second passage element 64 has the tapered portion 66d on an upstream side of the straight portion 66c, and the tapered portion 66d is located at an intermediate portion of the second passage element 64. Thus, the inner diameter of the second passage element 64 is gradually reduced at its intermediate portion, and a raw material smoothly passes through the second passage element 64, and, at the same time, the elongation action applied to the raw material can be enhanced.

Variation 4 of First Embodiment

Figure 17:
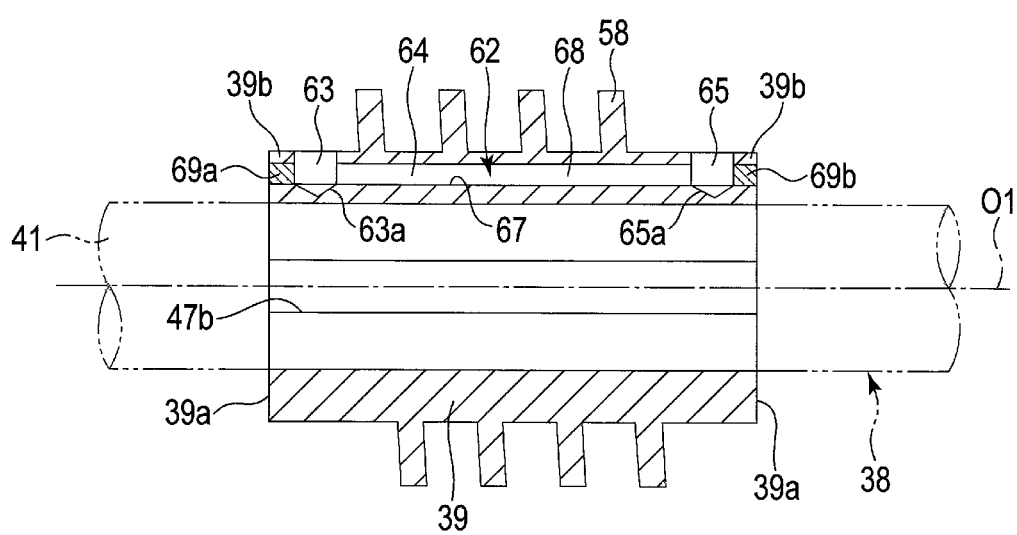
FIG. 17 is a cross-sectional view schematically showing a variation 4 of the screw main body in the first embodiment.

FIG. 17 shows a variation 4 related to the first embodiment.

In the variation 4 shown in FIG. 17, the passage 62 is formed in the single cylindrical body 39. The second passage element 64 of the passage 62 is formed by machining the cylindrical body 39 from the side of one of the end surfaces 39a of the cylindrical body 39 with the use of a drill, for example.

Consequently, a through-hole 68 penetrating in the axial direction of the cylindrical body 39 and having a circular cross-sectional shape is formed in the cylindrical body 39. The through-hole 68 is opened in both the end surfaces 39a of the cylindrical body 39. The through-hole 68 intersects with the first passage element 63 and the third passage element 65 in the cylindrical body 39.

Two opening ends of the through-hole 68 are respectively closed in a liquid-tight manner by plug bodies 69a and 69b. Consequently, the second passage element 64 connecting the first passage element 63 and the third passage element 65 is specified in the cylindrical body 39.

According to such a constitution, when the cylindrical body 39 is bored from the side of one of the end surfaces 39a of the cylindrical body 39 with the use of a drill, the passage 62 can be formed in the cylindrical body 39. Thus, when the passage 62 is formed in the screw main body 37, the cylindrical body may not be divided into two portions, and the number of the cylindrical bodies 39 can be reduced.

In the formation of the through-hole 68 in the cylindrical body 39, a distal end of the through-hole 68 may be closed by the end wall 39b of the cylindrical body 39 without opening the distal end of the through-hole 68 at the other end surface 39a of the cylindrical body 39. Thus, the plug body 69b can be eliminated, so that the number of components constituting the passage 62 can be reduced.

Variation 5 of First Embodiment

FIG. 18 shows a variation 5 that is a further development of the variation 4.

As shown in FIG. 18, the through-hole 68 penetrating through the cylindrical body 39 has an upstream portion 68a, a downstream portion 68b, and an intermediate portion 68c. The upstream portion 68a, the downstream portion 68b, and the intermediate portion 68c are arranged coaxially in a line along the axial direction of the cylindrical body 39. The upstream portion 68a intersects with the first passage element 63 in the cylindrical body 39 and is opened in one of the end surfaces 39a of the cylindrical body 39. An opening end of the upstream portion 68a is closed in a liquid-tight manner by the plug body 69a.

The downstream portion 68b is formed to have a smaller inner diameter than the upstream portion 68a. The downstream portion 68b intersects with the third passage element 65 in the cylindrical body 39 and is opened in the other end surface 39a of the cylindrical body 39. An opening end of the downstream portion 68c is closed in a liquid-tight manner by the plug body 69b.

The intermediate portion 68c is located between the upstream portion 68a and the downstream portion 68b. The inner diameter of the intermediate portion 68c is continuously reduced in the direction from the upstream portion 68a to the downstream portion 68b. Thus, the inner diameter of the second passage element 64 as a main element applying the elongation action to a raw material changes at an intermediate portion along the flowing direction of the raw material.

According to the variation 5, the inner diameter of the intermediate portion 68c of the second passage element 64 of the passage 62 is gradually reduced from upstream to downstream. Thus, a raw material smoothly passes through the second passage element 64, and, at the same time, the elongation action applied to the raw material can be enhanced.

Second Embodiment

FIGS. 19 to 25 disclose a second embodiment. The second embodiment differs from the first embodiment in terms of a screw main body 37. Other configurations of a second extruder 3 are essentially similar to those of the first embodiment. Thus, in the second embodiment, the same reference symbols denote the same components as those according to the first embodiment, and their descriptions will be omitted.

Figure 20:
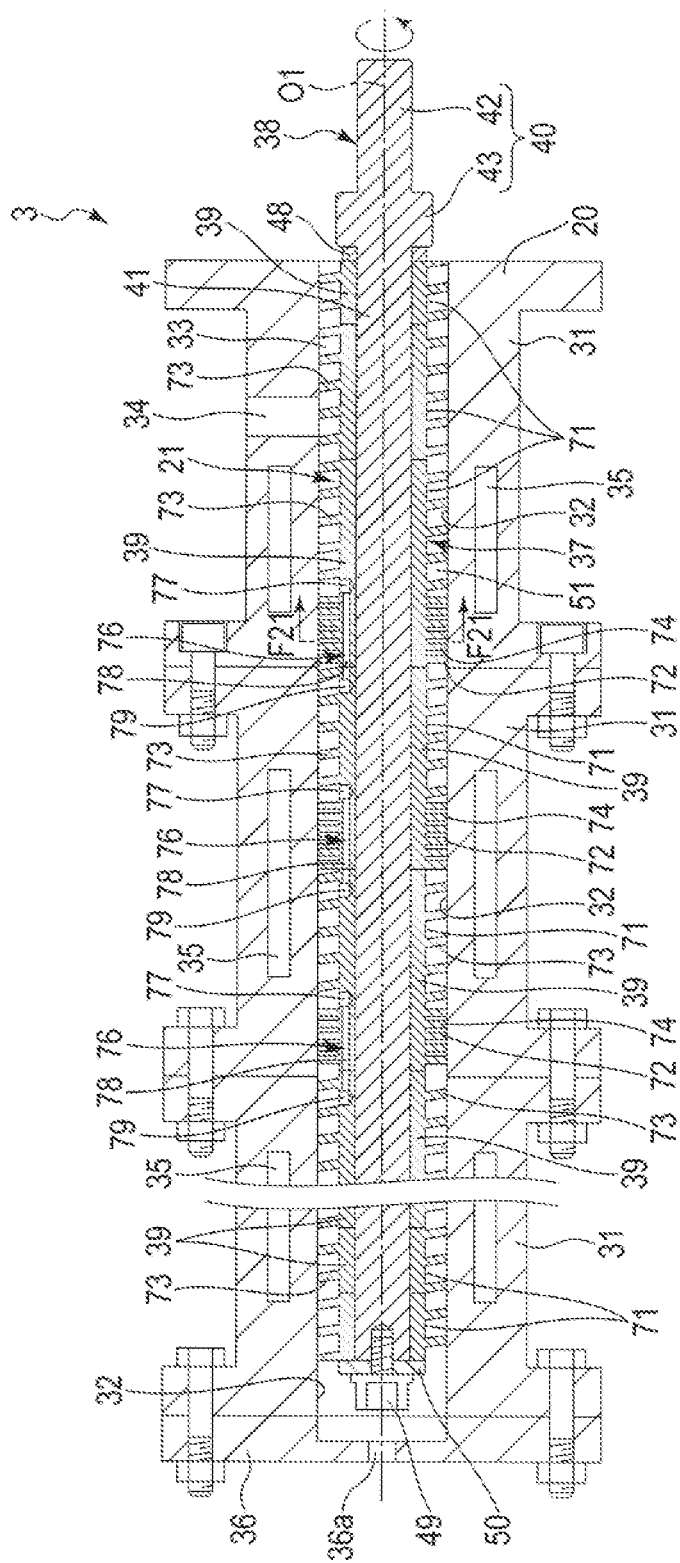
FIG. 20 is a cross-sectional view of the second extruder in which a barrel and a screw are cross-sectioned in the second embodiment.
Figure 21:
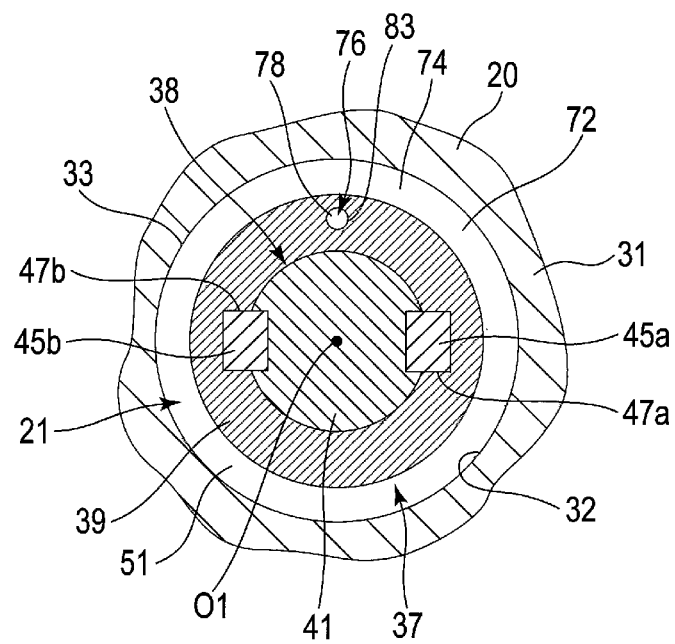
FIG. 21 is a cross-sectional view along a line F21-F21 in FIG. 20.

As shown in FIGS. 19 and 20, a plurality of cylindrical bodies 39 constituting the screw main body 37 are fastened in an axial direction of a second shaft portion 41 between a first collar 48 and a second collar 50 as in the first embodiment. According to this constitution, the end surfaces 39a of the adjacent cylindrical bodies 39 are firmly adhered with no space between.

The screw main body 37 has a plurality of conveyance portions 71 conveying a raw material and a plurality of barrier portions 72 limiting flow of the raw material. The conveyance portions 71 and the barrier portions 72 are alternately arranged in a row in an axial direction of the screw main body 37.

Figure 22:
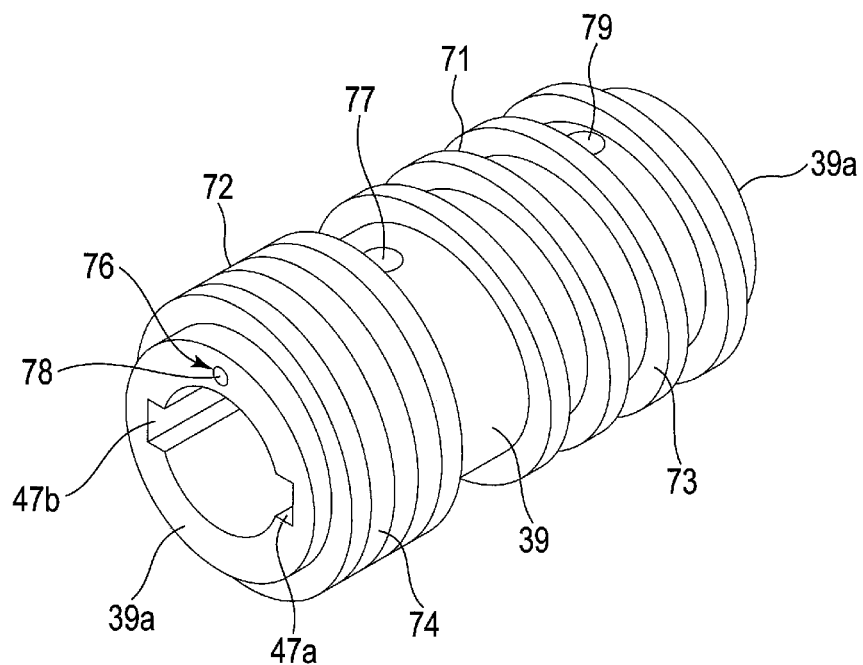
FIG. 22 is a perspective view of a cylindrical body used in the second embodiment.

As shown in FIGS. 20 and 22, each of the conveyance portions 71 has a spirally twisted flight 73. The flight 73 extends from an outer peripheral surface along a circumferential direction of the cylindrical body 39 toward a conveyance path 51. When a screw 21 rotates to the left, the flight 73 is twisted to convey the raw material from a base end of the screw main body 37 toward a leading end thereof. In other words, in the flight 73, the twisting direction of the flight 73 is twisted to the right as in a right screw.

The length of the conveyance portion 71 along the axial direction of the screw main body 37 is suitably set according to the kind of the raw material, a kneading degree of the raw material, and production of the kneaded material per unit time, for example. Although the conveyance portion 71 is a region where the flight 73 is formed on at least the outer peripheral surface of the cylindrical body 39, the region is not specified by a region between a starting point and an ending point of the flight 73.

In other words, a region of the outer peripheral surface of the cylindrical body 39 deviated from the flight 73 is sometimes regarded as the conveyance portion 71. Further, when a cylindrical spacer or a cylindrical collar is disposed at a position adjacent to the cylindrical body 39 having the flight 73, the spacer or the collar may be included in the conveyance portion 71.

Each of the barrier portions 72 has a spirally twisted flight 74. The flight 74 extends from the outer peripheral surface along the circumferential direction of the cylindrical body 39 toward the conveyance path 51. When the screw 21 rotates to the left, the flight 74 is twisted to convey the raw material from the leading end of the screw main body 37 toward the base end thereof. In other words, in the flight 74, the twisting direction of the flight 74 is twisted to the left as in a left screw.

The pitch of the flight 74 of the barrier portion 72 is the same as the pitch of the flight 73 of the conveyance portion 71 or smaller than the pitch of the flight 73. A slight clearance is secured between the tops of the flights 73 and 74 and an inner peripheral surface of a cylinder portion 33.

The length of the barrier portion 72 along the axial direction of the screw main body 37 is suitably set according to the kind of the raw material, the kneading degree of the raw material, and the production of the kneaded material per unit time, for example. The barrier portion 72 functions to dam the flow of the raw material sent by the conveyance portion 71. Namely, the barrier portion 72 is adjacent to the conveyance portion 71 on the downstream side in the conveyance direction of the raw material and is configured to prevent the raw material sent by the conveyance portion 71 from passing through the clearance between the top of the flight 74 and the inner peripheral surface of the cylinder portion 33.

According to this embodiment, at the base end of the screw main body 37, the conveyance portions 71 are continuously arranged in the axial direction of the screw main body 37. A supply port 34 of a barrel 20 faces an intermediate portion along an axial direction of the conveyance portion 71 at the base end of the screw main body 37. Similarly, at the leading end of the screw main body 37, the conveyance portions 71 are continuously arranged in the axial direction of the screw main body 37.

As shown in FIGS. 20 and 22, at an intermediate portion of the screw main body 37, the flight 73 constituting the conveyance portion 71 and the flight 74 constituting the barrier portion 72 are continuously formed on the outer peripheral surface along the circumferential direction of the common cylindrical body 39. Namely, two kinds of the flights 73 and 74 having different functions are continuously formed in the axial direction on the outer peripheral surface of the cylindrical body 39. The flight 74 constituting the barrier portion 72 is located on the side of the leading end of the screw main body 37 with respect to the flight 73 constituting the conveyance portion 71.

As shown in FIGS. 19 to 24, the screw main body 37 has a plurality of passages 76 extending in the axial direction of the screw main body 37. Each of the passages 76 is formed in the cylindrical bodies 39, formed with two kinds of the flights 73 and 74, to cross over between the two cylindrical bodies 39.

More specifically, each of the passages 76 is specified by first to third passage elements 77, 78, and 79. The first passage element 77 can be paraphrased as an inlet of the passage 76. The first passage element 77 is opened in the outer peripheral surface of one of the two adjacent cylindrical bodies 39. An opening end of the first passage element 77 is located at a boundary between the conveyance portion 71 and the barrier portion 72 and deviated from the flight 73 of the conveyance portion 71 and the flight 74 of the barrier portion 72.

In this embodiment, the first passage element 77 is formed by machining the outer peripheral surface of one of the cylindrical bodies 39 with the use of a drill, for example. Thus, the first passage element 77 is a hole having a circular cross-sectional shape and extends from the outer peripheral surface of one of the cylindrical bodies 39 in the radial direction of the cylindrical body 39 so as to be perpendicular to an axis line O1. A bottom 77a of the first passage element 77 is an inclined surface shaved off into the shape of a cone by the tip of the drill.

The second passage element 78 can be paraphrased as a passage main body through which the raw material circulates. The second passage element 78 extends parallel to the axis line O1 along the axial direction of the screw main body 37 to cross over between the two adjacent cylindrical bodies 39. Accordingly, the second passage element 78 is linearly provided without being branched on its way and has a predetermined entire length.

Figure 23:
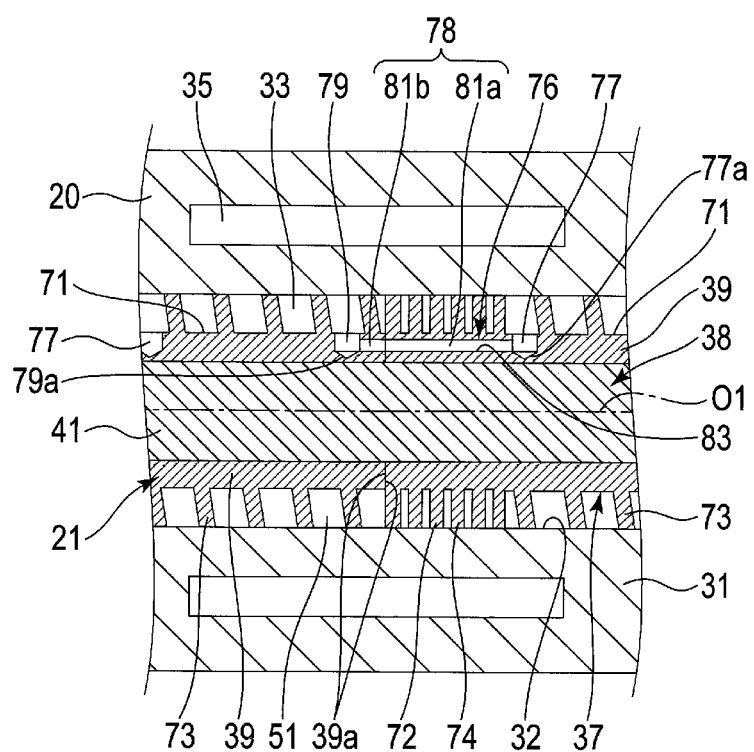
FIG. 23 is an enlarged cross-sectional view of a structure of a passage formed in a screw main body in the second embodiment.
Figure 24:
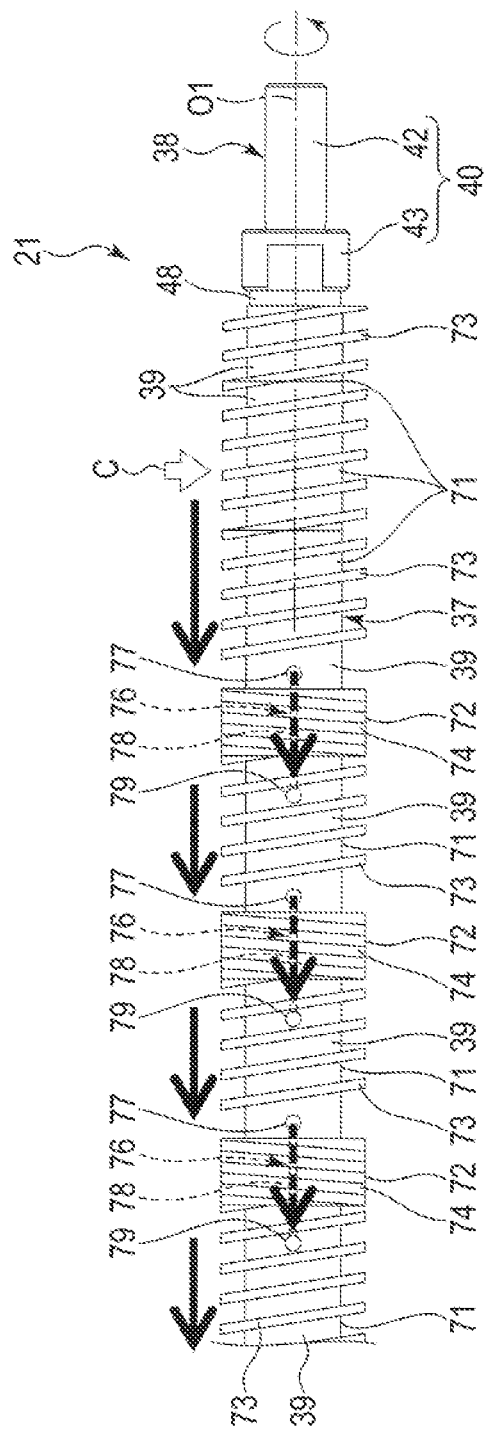
FIG. 24 is a side view of the screw showing a flowing direction of a raw material when the screw rotates in the second embodiment.

As best shown in FIG. 23, the second passage element 78 includes a first portion 81a formed in one of the cylindrical bodies 39 and a second portion 81b formed in the other cylindrical body 39.

The first portion 81a of the second passage element 78 linearly extends in the axial direction of one of the cylindrical bodies 39 and is opened in the end surface 39a of the cylindrical body 39 on the other cylindrical body 39 side. An end on the opposite side of the opening end of the first portion 81a is closed by an intermediate portion along the axial direction of one of the cylindrical bodies 39. According to this embodiment, the first portion 81a of the second passage element 78 is formed by machining one of the cylindrical bodies 39 from the side of the end surface 39a of the cylindrical body 39 with the use of a drill, for example. Thus, the first portion 81a is specified by a hole having a circular cross-sectional shape.

The second portion 81b of the second passage element 78 linearly extends in the axial direction of the other cylindrical body 39 and is opened in the end surface 39a of the cylindrical body 39 on the one cylindrical body 39 side. An end on the opposite side of the opening end of the second portion 81b is closed in the other cylindrical body 39.

According to this embodiment, the second portion 81b of the second passage element 78 is formed by machining the other cylindrical body 39 from the side of the end surface 39a of the cylindrical body 39 with the use of a drill, for example. Thus, the second portion 81b is specified by a hole having a circular cross-sectional shape as in the first portion 81a.

As best shown in FIGS. 20 and 23, the opening end of the first portion 81a and the opening end of the second portion 81b are coaxially butt-joined so as to communicate with each other when the two adjacent cylindrical bodies 39 are fastened in the axial direction of the second shaft portion 41 of the rotating shaft 38.

The third passage element 79 can be paraphrased as an outlet of the passage 76. The third passage element 79 is opened in the outer peripheral surface of the other one of the two adjacent cylindrical bodies 39. An opening end of the third passage element 79 is located at an upstream end of the conveyance portion 71 and deviated from the flight 73 of the conveyance portion 71. As a result, the opening end of the first passage element 77 and the opening end of the third passage element 79 are away from each other in the axial direction of the screw main body 37 while interposing the barrier portion 72 in between.

In this embodiment, the third passage element 79 is formed by machining the outer peripheral surface of the other cylindrical body 39 with the use of a drill, for example. Thus, the third passage element 79 is a hole having a circular cross-sectional shape and extends from the outer peripheral surface of the other cylindrical body 39 in the radial direction of the cylindrical body 39. A bottom 79a of the third passage element 79 is an inclined surface shaved off into the shape of a cone by the tip of the drill.

As shown in FIG. 23, an end on the opposite side of the opening end of the first portion 81a of the second passage element 78 is connected to the first passage element 77 in one of the cylindrical bodies 39. The first passage element 77 and the first portion 81a of the second passage element 78 communicate with each other while maintaining their circular cross-sectional shapes. The first portion 81a of the second passage element 78 is connected to the first passage element 77 at a position deviated from the conical bottom 77a of the first passage element 77. The first portion 81a of the second passage element 78 may be communicated with a conical bottom 77a of the first passage element 77.

Thus, the first passage element 77 can be paraphrased as a first rising portion which rises from an end of the first portion 81a of the second passage element 78 in the radial direction of the cylindrical body 39 and is opened in the outer peripheral surface of the screw main body 37.

The end on the opposite side of the opening end of the second portion 81b of the second passage element 78 is connected to the third passage element 79 in the other cylindrical body 39. The third passage element 79 and the second portion 81b of the second passage element 78 communicate with each other while maintaining their circular cross-sectional shapes. The second portion 81b of the second passage element 78 is connected to the third passage element 79 at a position deviated from the conical bottom 79a of the third passage element 79. The second portion 81b of the second passage element 78 may be connected to the conical bottom 79a of the third passage element 79.

Thus, the third passage element 79 can be paraphrased as a second rising portion which rises from an end of the second portion 81b of the second passage element 78 in the radial direction of the cylindrical body 39 and is opened in the outer peripheral surface of the screw main body 37.

In addition, by virtue of the provision of the passage 76 in the cylindrical body 39, the passage 76 is made eccentric from the axis line O1 of the rotating shaft 38. Thus, the passage 76 is deviated from the axis line O1 and revolves around the axis line O1 when the screw main body 37 rotates.

An inner diameter of a hole constituting the second passage element 78 is set to not less than 1 mm and less than 6 mm, for example, and is preferably not less than 1 mm and not more than 5 mm. An inner diameter of the second passage element 78 is smaller than an inner diameter of the first passage element 77 serving as an inlet. Further, a cross-sectional area along the radial direction of the second passage element 78 is set to be much smaller than a cross-sectional area of the conveyance path 51 along the radial direction of the cylinder portion 33.

According to this embodiment, the cylindrical body 39 has a cylindrical wall surface 83 defining the shape of the hole constituting the first to third passage elements 77, 78, and 79. The wall surface 83 continuously surrounds the first to third passage elements 77, 78, and 79 in the circumferential direction.

In other words, the first to third passage elements 77, 78, and 79 surrounded by the wall surface 83 are hollow spaces allowing only circulation of a raw material, and the spaces include no element constituting the screw main body 37. When the screw main body 37 rotates, the wall surface 83 revolves around the axis line O1 without being rotated centering on the axis line O1.

In this embodiment, when the cylindrical bodies 39 formed with the flights 73 and 74 are removed from the rotating shaft 38, the cylindrical body 39 provided with at least one of the first passage element 77 and the third passage element 79 and including the second passage element 78 can be paraphrased as a screw element.

According to this constitution, the raw material blended in a first extruder 2 and having a flowability is continuously supplied from the supply port 34 of the second extruder 3 to the conveyance path 51. The raw material supplied to the second extruder 3 is introduced to the outer peripheral surface of the conveyance portion 71 located at the base end of the screw main body 37, as shown by the arrow C in FIG. 24. Since the screw 21 rotates to the left in the counterclockwise direction as the screw 21 is viewed from the direction of the base end of the rotating shaft 38, the flight 73 of the conveyance portion 71 conveys the raw material, introduced from the supply port 34, toward the leading end of the screw main body 37, as shown by the solid arrows in FIGS. 24 and 25.

In this case, the shear action occurring due to a speed difference between the flight 73 revolving in the conveyance path 51 and the inner peripheral surface of the cylinder portion 33 is applied to the raw material, and, at the same time, the raw material is stirred by subtle degrees of twist of the flight 73. As a result, the raw material is fully kneaded, and dispersion of a polymer component of the raw material is advanced.

The raw material subjected to the shear action reaches a boundary between the conveyance portion 71 and the barrier portion 72 along the conveyance path 51. When the screw 21 rotates to the left, since the flight 74 of the barrier portion 72 conveys the raw material from the leading end of the screw main body 37 toward the base end thereof, the flight 74 dams the raw material sent by the flight 73.

Namely, when the screw 21 rotates to the left, the flight 74 of the barrier portion 72 limits the flow of the raw material sent by the flight 73 of the conveyance portion 71 and interferes with passage of the raw material through a clearance between the barrier portion 71 and the inner peripheral surface of the cylinder portion 33.

Figure 25:
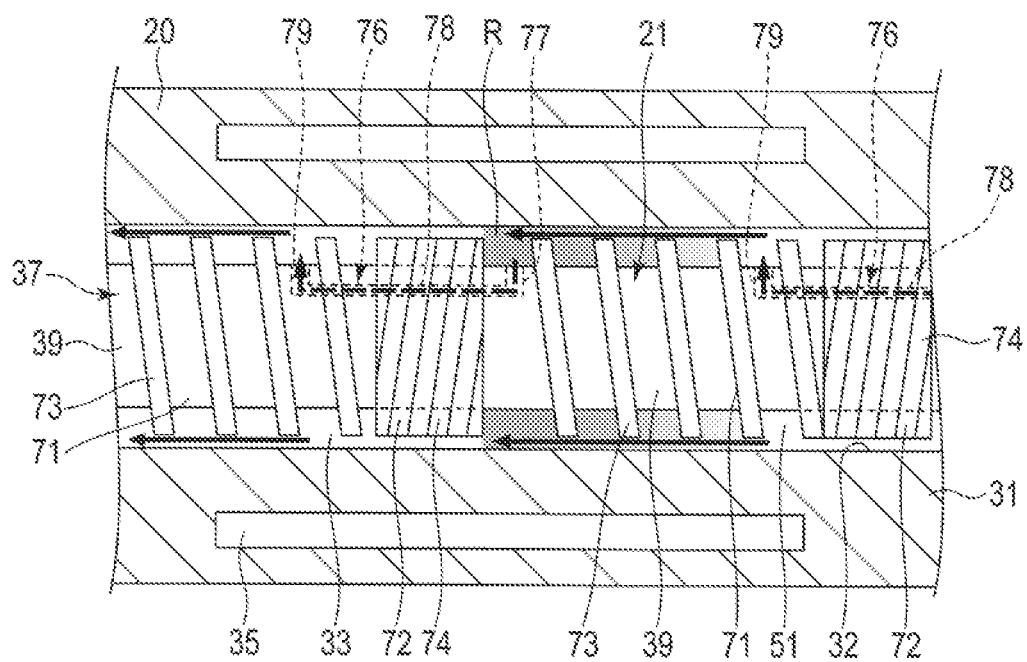
FIG. 25 is a cross-sectional view of the second extruder schematically showing the flowing direction of the raw material when the screw rotates in the second embodiment.

As a result, the pressure of the raw material is increased at the boundary between the conveyance portion 71 and the barrier portion 72. More specifically, FIG. 25 shows the filling rate of the raw material at the places in the conveyance path 51, which correspond to the passage 76, with gradations, and the filling rate of the raw material becomes greater as the tone becomes darker. As seen in FIG. 25, in the conveyance path 51, the filling rate of the raw material becomes greater as it approaches the barrier portion 72, and immediately before the barrier portion 72, the filling rate of the raw material is 100%.

Thus, a raw-material receiver R in which the filling rate of the raw material is 100% is formed immediately before the barrier portion 72. In the raw-material receiver R, the flow of the raw material is dammed, whereby the pressure of the raw material is increased. The raw material whose pressure has been increased flows into the second passage element 78 from the first passage element 77 of the passage 76 opened in the boundary between the conveyance portion 71 and the barrier portion 72, as shown by the dashed arrows in FIGS. 24 and 25. The raw material flowing into the second passage element 78 circulates in the second passage element 78 from the base end of the screw main body 37 toward the leading end thereof.

The cross-sectional area along the radial direction of the second passage element 78 is smaller than the cross-sectional area of the conveyance path 51 along the radial direction of the cylinder portion 33. In other words, since the inner diameter of the second passage element 78 is much smaller than the outer diameter of the screw main body 37, when the raw material passes through the second passage element 78, the raw material is rapidly squeezed. Consequently, the elongation action is applied to the raw material.

In addition, since the cross-sectional area of the second passage element 78 is satisfactorily smaller than the cross-sectional area of the conveyance path 51, despite the raw material accumulated in the raw-material receiver R flowing into the first passage element 77, the raw-material receiver R immediately before the barrier portion 72 does not disappear. Thus, even if some variation occurs in the flow volume of the raw material sent into the barrier portion 72 by the flight 73 of the conveyance portion 71, the variation in the flow volume can be absorbed by the raw material accumulated in the raw-material receiver R. Thus, the raw material is supplied to the passage 76 in a stable state at all times.

As shown by the dashed arrows in FIG. 25, the raw material passing through the second passage element 78 of the passage 76 is returned to the outer peripheral surface of another adjacent cylindrical body 39 through the third passage element 79. The returned raw material is conveyed in the direction of the leading end of the screw main body 37 by the flight 73 of another cylindrical body 39 and is subjected to the shear action again in the process of conveyance. The raw material subjected to the shear action flows from the first passage element 77 of the next passage 76 into the second passage element 78 and, at the same time, is subjected to the elongation action again in the process of passing through the second passage element 78.

At an intermediate portion along the axial direction of the screw main body 37, the conveyance portions 71 and the barrier portions 72 are alternately arranged in the axial direction of the screw main body 37, and the passages 76 are arranged at intervals in the axial direction of the screw main body 37. Thus, the raw material introduced from the supply port 34 to the screw main body 37 is continuously conveyed without interruption in the direction from the base end of the screw main body 37 to the leading end thereof while being alternately and repeatedly subjected to the shear action and the elongation action. Accordingly, the kneading degree of the raw material is enhanced, and dispersion of a polymer component of the raw material is facilitated.

In this embodiment, the second passage elements 78 of the passages 76 are individually opened in the outer peripheral surface of the screw main body 37 through the first passage elements 77 and the third passage elements 79. Thus, in each of the passages 76, the raw material flowing from the first passage element 77 into the second passage element 78 returns to the outer peripheral surface of the screw main body 37, always through the third passage element 79, so that the raw materials are not mixed with each other between the passages 76.

Accordingly, it is possible to avoid situations where the kneading degree of the raw material becomes excessive, so that appropriate kneading suitable for a desired kneading degree can be achieved.

Since the passage 76 applying the elongation action to the raw material extends in the axial direction of the screw main body 37 at a position eccentric from the axis line O1 serving as a rotation center of the screw main body 37, the passage 76 revolves around the axis line O1. Namely, the wall surface 83 specifying the passage 76 revolves around the axis line O1 without being rotated centering on the axis line O1.

Thus, when the raw material passes through the passage 78, although the raw material is subjected to centrifugal force, shear force accompanying the rotation of the wall surface 83 on its axis does not act on the raw material. Accordingly, the raw material returning to the outer peripheral surface of the cylindrical body 39 through the passage 76 is mainly subjected to the elongation action. As a result, a place where the shear action is applied to the raw material and a place where the elongation action is applied to the raw material are clearly determined, so that the kneading degree of the raw material can be controlled with high accuracy.

Also in the second embodiment, the cylindrical body 39 to be inserted onto the rotating shaft 38 can be freely selected and exchanged according to the kneading degree of the raw material, for example, and the positions of the conveyance portion 71 and the barrier portion 72 can be arbitrarily changed within the range of the length of the screw main body 37.

For example when the flight 73 is locally worn to adversely affect conveyance of the raw material or a physical property thereof, the cylindrical body 39 having the worn flight 73 may be replaced with a preliminary cylindrical body 39 having a new flight 73, that is, a screw element. Accordingly, the other cylindrical bodies 39 and the rotating shaft 38 of the screw main body 37 can be repeatedly used, and all components of the screw main body 37 may not be replaced with new ones.

Thus, since it is economical and wear can be corresponded by partial repair of the screw main body 37, a time for stopping operation of a high shear processing device 1 can be reduced to the minimum necessary.

The passage 76 through which the elongation action is applied to the raw material is formed crossing over between the two cylindrical bodies 39 formed with two kinds of the flights 73 and 74. Thus, in both of the two cylindrical bodies 39, a relative positional relationship between two kinds of the flights 73 and 74 and the passage 76 is fixedly determined in both the axial and circumferential directions of the screw main body 37. Thus, special alignment between two kinds of the flights 73 and 74 and the passage 76 is not required.

According to the second embodiment, the passage 76 crossing over between the two adjacent cylindrical bodies 39 is formed by fastening the cylindrical bodies 39 in the axial direction of the second shaft portion 41.

Namely, when the passage 76 is formed in the screw main body 37, the cylindrical body 39 which is much shorter than the entire length of the screw main body 37 may be machined using a drill, for example. Thus, when the passage 76 is formed, workability and handling of a workpiece are facilitated.

Third Embodiment

FIGS. 26 to 35 disclose a third embodiment. The third embodiment differs from the first embodiment in terms of a screw main body 37. Other configurations of a second extruder 3 are essentially similar to those of the first embodiment. Thus, in the third embodiment, the same reference symbols denote the same components as those according to the first embodiment, and their descriptions will be omitted.

Figure 26:
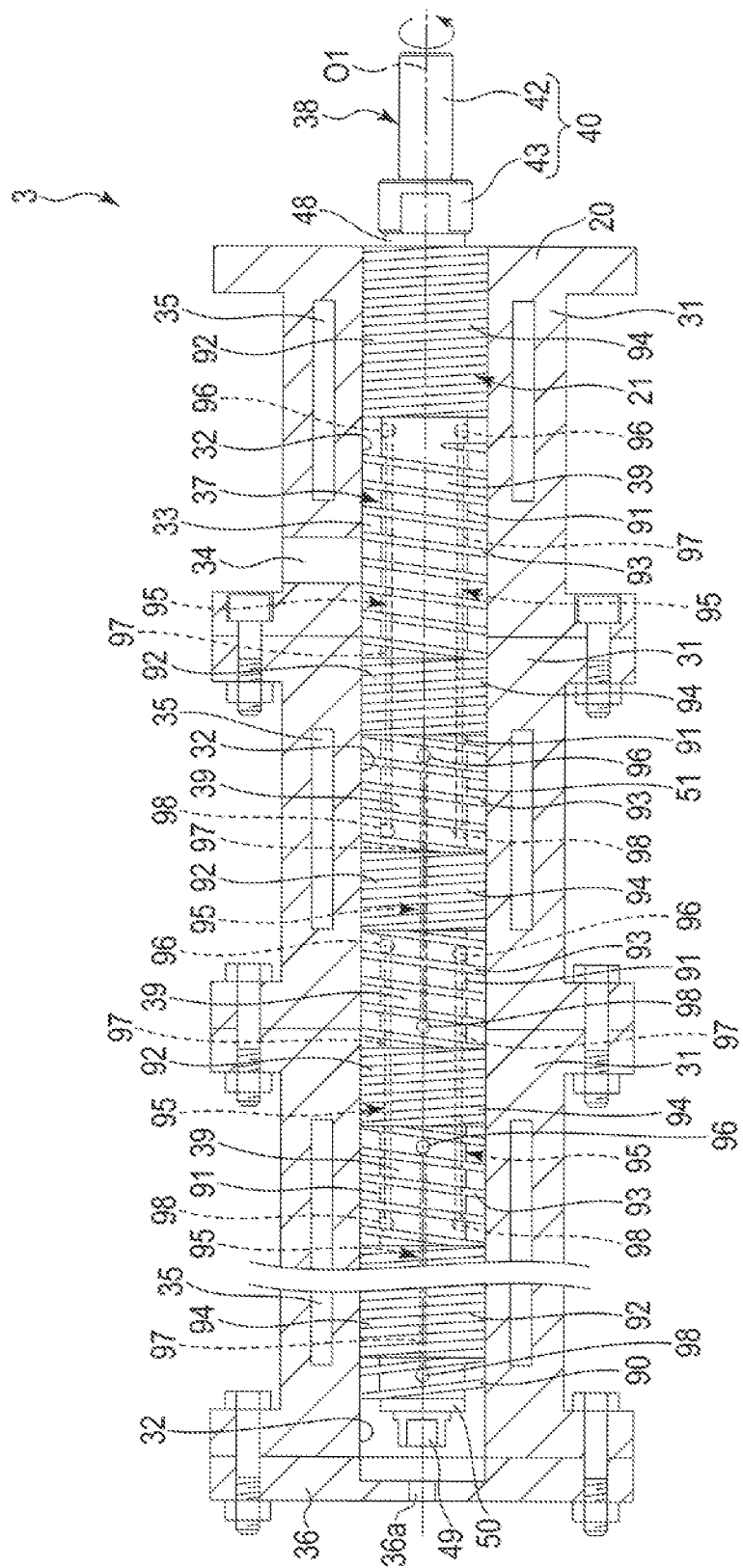
FIG. 26 is a cross-sectional view of a second extruder used in a third embodiment.
Figure 27:
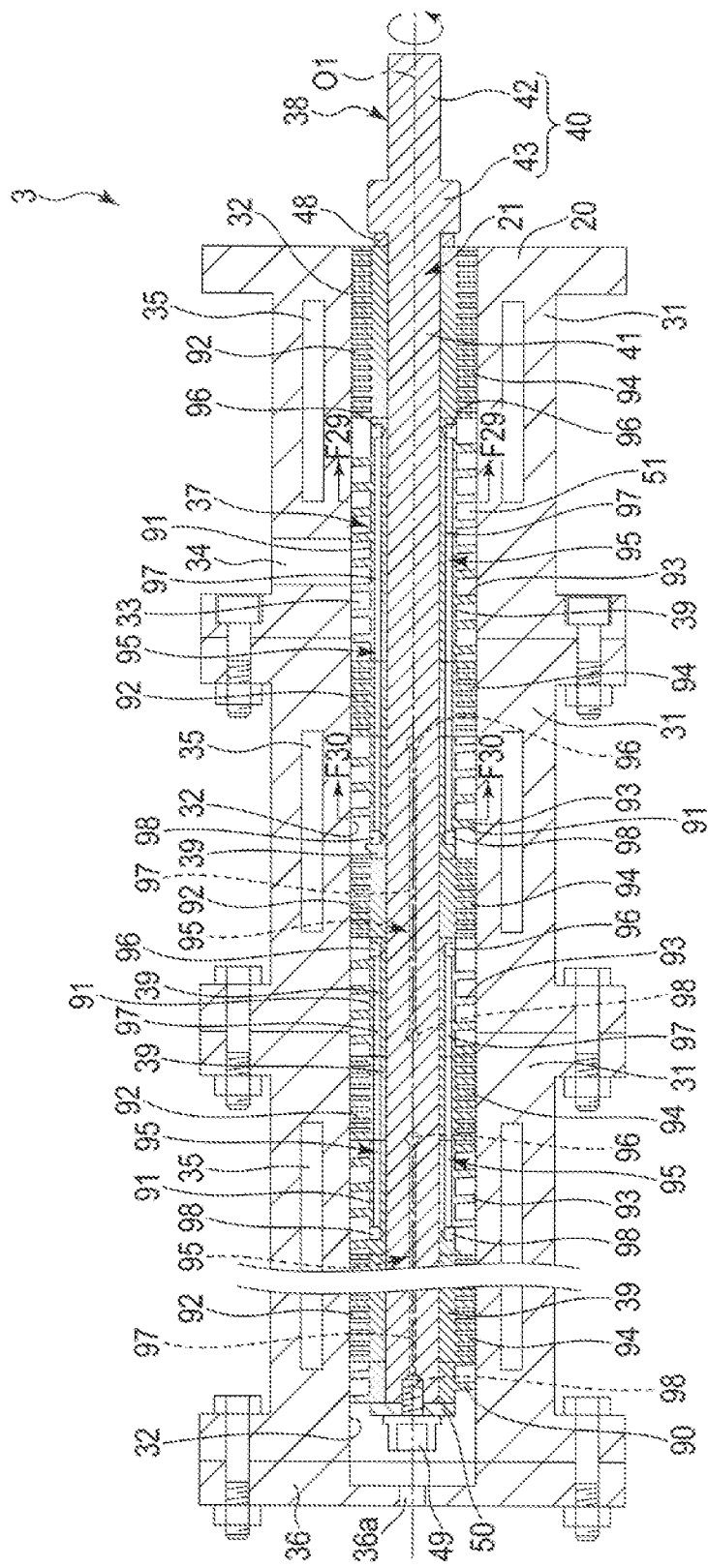
FIG. 27 is a cross-sectional view of the second extruder in which a barrel and a screw are cross-sectioned in the third embodiment.
Figure 29:
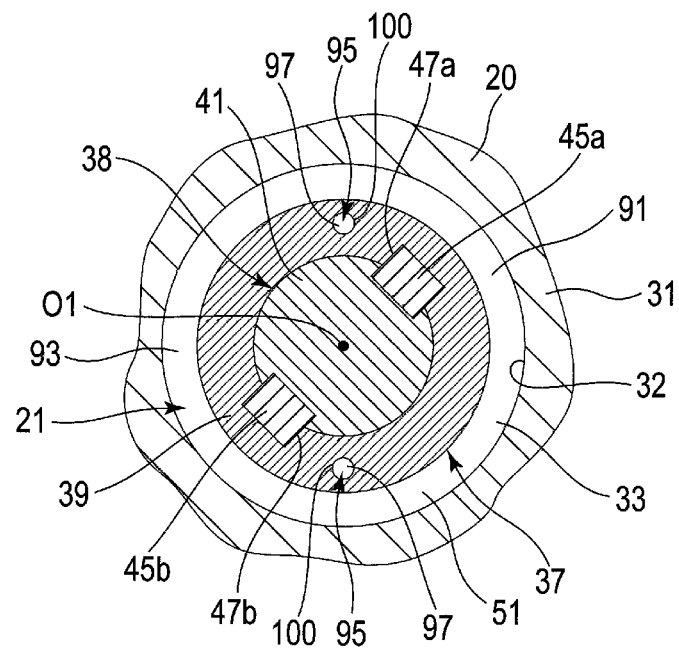
FIG. 29 is a cross-sectional view along a line F29-F29 in FIG. 27.

As shown in FIGS. 26 and 27, a plurality of cylindrical bodies 39 constituting the screw main body 37 are fastened in an axial direction of a second shaft portion 41 between a first collar 48 and a second collar 50 as in the first embodiment. According to this constitution, the end surfaces 39a of the adjacent cylindrical bodies 39 are firmly adhered with no space between.

As shown in FIG. 28, the screw main body 37 has a plurality of conveyance portions 91 for conveying a raw material and a plurality of barrier portions 92 for limiting flow of the raw material. The conveyance portions 91 and the barrier portions 92 are alternately arranged in a row in an axial direction of the screw main body 37.

Each of the conveyance portions 91 has a spirally twisted flight 93. The flight 93 extends from an outer peripheral surface along a circumferential direction of the cylindrical body 39 toward a conveyance path 51. When a screw 21 rotates to the left, the flight 93 is twisted to convey the raw material from a leading end of the screw main body 37 toward a base end thereof. In other words, in the flight 93, the twisting direction of the flight 93 is twisted to the left as in a left screw.

The length of the conveyance portion 91 along the axial direction of the screw main body 37 is suitably set according to the kind of the raw material, a kneading degree of the raw material, and production of a kneaded material per unit time, for example. Although the conveyance portion 91 is a region where the flight 93 is formed on at least the outer peripheral surface of the cylindrical body 39, the region is not specified by a region between a starting point and an ending point of the flight 93.

Namely, a region of the outer peripheral surface of the cylindrical body 39 deviated from the flight 93 is sometimes regarded as the conveyance portion 91, and when a cylindrical spacer or a cylindrical collar is disposed at a position adjacent to the cylindrical body 39 having the flight 93, the spacer or the collar may be included in the conveyance portion 91.

Each of the barrier portions 92 has a spirally twisted flight 94. The flight 94 extends from an outer peripheral surface along a circumferential direction of the cylindrical body 39 toward the conveyance path 51. When the screw 21 rotates to the left, the flight 94 is twisted to convey the raw material from the base end of the screw main body 37 toward the leading end thereof. In other words, in the flight 94, the twisting direction of the flight 94 is twisted to the right as in a right screw.

The pitch of the flight 94 is the same as or smaller than the pitch of the flight 93. A slight clearance is secured between the tops of the flights 93 and 94 and an inner peripheral surface of a cylinder portion 33.

The length of the barrier portion 92 along the axial direction of the screw main body 37 is suitably set according to the kind of the raw material, the kneading degree of the raw material, and the production of the kneaded material per unit time, for example. The barrier portion 92 functions to dam the flow of the raw material sent by the conveyance portion 91. Namely, the barrier portion 92 is adjacent to the conveyance portion 91 on the downstream side in the conveyance direction of the raw material and is configured to prevent the raw material sent by the conveyance portion 91 from passing through the clearance between the top of the flight 94 and the inner peripheral surface of the cylinder portion 33.

In this embodiment, the barrier portion 92 is located at the base end of the screw main body 37 corresponding to one end of a barrel 20, and a flight 90 for delivery is provided at the leading end of the screw main body 37 corresponding to the other end of the barrel 20. The flight 90 for delivery is formed on the outer peripheral surface of the cylindrical body 39 located at the leading end of the screw main body 37 and extends to the conveyance path 51. The flight 90 for delivery is twisted to convey the raw material in a direction from the base end of the screw main body 37 to the leading end thereof. A supply port 34 of the barrel 20 faces an intermediate portion along an axial direction of the conveyance portion 91 closest to the base end of the screw main body 37.

Figure 30:
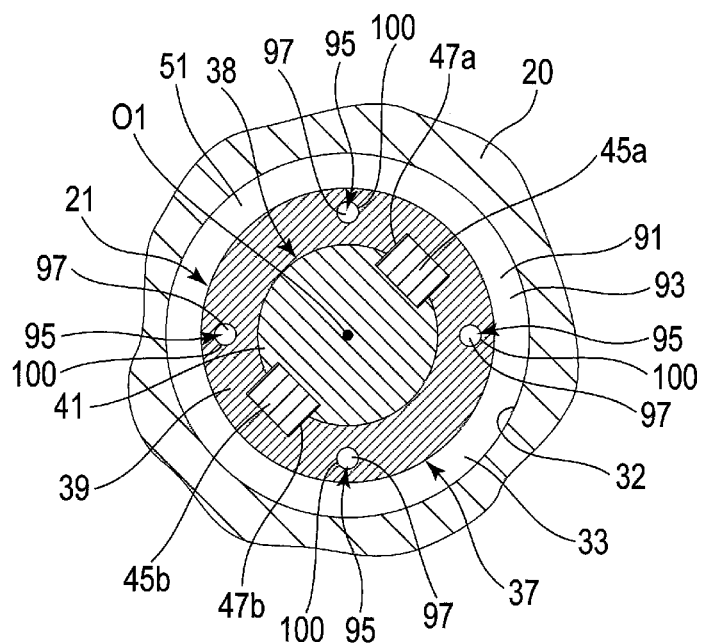
FIG. 30 is a cross-sectional view along a line F30-F30 in FIG. 27.

As shown in FIGS. 26 to 31, the screw main body 37 has a plurality of passages 95 extending in the axial direction of the screw main body 37. The passages 95 are arranged at intervals in the axial direction of the screw main body 37. At an intermediate portion along the axial direction of the screw main body 37, as shown in FIG. 30, the four passages 95 extending in the axial direction of the screw main body 37 are arranged at intervals of 90° in a circumferential direction of the screw main body 37.

As shown in FIGS. 27 and 31, when the barrier portion 92 and the two conveyance portions 91 interposing the barrier portion 92 in between are regarded as a single unit, each of the passages 95 is formed crossing over among the three cylindrical bodies 39 corresponding to these conveyance portions 91 and the barrier portion 92.

More specifically, each of the passages 95 is specified by first to third passage elements 96, 97, and 98. The first passage element 96 can be paraphrased as an inlet of the passage 95. The first passage element 96 is opened in the outer peripheral surface of the cylindrical body 39 corresponding to the conveyance portion 91 located on the side of the base end of the screw main body 37 relative to the barrier portion 92 for each of the units. An opening end of the first passage element 96 is located near a boundary with the adjacent barrier portions 92 on the side of the base end of the screw main body 37 relative to the conveyance portion 91 on the outer peripheral surface of the cylindrical body 39 corresponding to the conveyance portion 91. The opening end of the first passage element 96 is deviated from the flight 93.

In this embodiment, the first passage element 96 is formed by machining the outer peripheral surface of the cylindrical body 39 with the use of a drill, for example. Thus, the first passage element 96 is a hole having a circular cross-sectional shape and extends from the outer peripheral surface of the cylindrical body 39 in the radial direction of the cylindrical body 39 so as to be perpendicular to an axis line O1. A bottom 96a of the first passage element 96 is an inclined surface shaved off into the shape of a cone by the tip of the drill.

The second passage element 97 can be paraphrased as a passage main body through which the raw material circulates. The second passage element 97 extends parallel to the axis line O1 of the screw main body 37 to cross over among the three cylindrical bodies 39 corresponding to the conveyance portions 91 and the barrier portion 92. Accordingly, the second passage element 97 is linearly provided in the axial direction of the screw main body 37 without being branched on its way and has a predetermined entire length.

The second passage element 97 is constituted of a first portion 99a formed in the cylindrical body 39 on the side of the base end of the screw main body 37 among the three cylindrical bodies 39, a second portion 99b formed in the intermediate cylindrical body 39 among the three cylindrical bodies 39, and a third portion 99c formed in the cylindrical body 39 on the side of the leading end of the screw main body 37 among the three cylindrical bodies 39. The first portion 99a, the second portion 99b, and the third portion 99c are coaxially arranged along the axial direction of the screw main body 37.

The first portion 99a of the second passage element 97 linearly extends in the axial direction of the cylindrical body 39 and is opened in the end surface 39a on the side of the adjacent intermediate cylindrical body 39 among the cylindrical bodies 39. An end on the opposite side of the opening end of the first portion 99a is closed by an end wall 39b of the cylindrical body 39. According to this embodiment, the first portion 99a of the second passage element 97 is formed by machining the end surface 39a of the cylindrical body 39 with the use of a drill, for example. Thus, the first portion 99a is specified by a hole having a circular cross-sectional shape.

The second portion 99b of the second passage element 97 is formed by machining the end surface 39a of the intermediate cylindrical body 39 with the use of a drill, for example. The second portion 99b penetrates through the intermediate cylindrical body 39 in the axial direction and is opened in both the end surfaces 39a of the intermediate cylindrical body 39. Thus, the second portion 99b is specified by a through-hole having a circular cross-sectional shape.

The third portion 99c of the second passage element 97 linearly extends in the axial direction of the cylindrical body 39 and is opened in the end surface 39a on the side of the adjacent intermediate cylindrical body 39 among the cylindrical bodies 39. An end on the opposite side of the opening end of the third portion 99c is closed by the end wall 39b of the cylindrical body 39. According to this embodiment, the third portion 99c of the second passage element 97 is formed by machining the end surface 39a of the cylindrical body 39 with the use of a drill, for example. Thus, the third portion 99c is specified by a hole having a circular cross-sectional shape.

As best shown in FIGS. 27 and 31, the opening end of the first portion 99a, the opening ends of the second portion 99b, and the opening end of the third portion 99c are coaxially butt-joined so as to communicate with each other when the three adjacent cylindrical bodies 39 are fastened in the axial direction of the second shaft portion 41 of the rotating shaft 38.

The third passage element 98 can be paraphrased as an outlet of the passage 95. The third passage element 98 is opened in the outer peripheral surface of the cylindrical body 39 corresponding to the conveyance portion 91 located on the side of the leading end of the screw main body 37 relative to the barrier portion 92 for each of the units. An opening end of the third passage element 98 is located near a boundary with the adjacent barrier portion 92 on the side of the leading end of the screw main body 37 relative to the conveyance portion 91 on the outer peripheral surface of the cylindrical body 39 corresponding to the conveyance portion 91. The opening end of the third passage element 98 is deviated from the flight 93.

In this embodiment, the third passage element 98 is formed by machining the outer peripheral surface of the cylindrical body 39 with the use of a drill, for example. Thus, the third passage element 98 is a hole having a circular cross-sectional shape and extends from the outer peripheral surface of the cylindrical body 39 in the radial direction of the cylindrical body 39. A bottom 98a of the third passage element 98 is an inclined surface shaved off into the shape of a cone by the tip of the drill.

The opening end of the first passage element 96 and the opening end of the third passage element 98 are away from each other in the axial direction of the screw main body 37 while interposing the two conveyance portions 91 and the barrier portion 92 in between. In other words, the form of the surface of the screw main body 37 changes between the opening end of the first passage element 96 and the opening end of the third passage element 98.

As shown in FIG. 31, an end on the opposite side of the opening end of the first portion 99a of the second passage element 97 is connected to the first passage element 96 in the cylindrical body 39. The first passage element 96 and the first portion 99a of the second passage element 97 communicate with each other while maintaining their circular cross-sectional shapes. An end of the first portion 99a of the second passage element 97 is connected to the first passage element 96 at a position deviated from the bottom 96a of the first passage element 96. The first portion 99a of the second passage element 97 may be communicated with the conical bottom 96a of the first passage element 96.

Thus, the first passage element 96 can be paraphrased as a first rising portion which rises from the end of the first portion 99a of the second passage element 97 in the radial direction of the cylindrical body 39 and is opened in the outer peripheral surface of the screw main body 37.

The end on the opposite side of the opening end of the third portion 99c of the second passage element 97 is connected to the third passage element 98 in the cylindrical body 39. The third passage element 98 and the third portion 99c of the second passage element 97 communicate with each other while maintaining their circular cross-sectional shapes. An end of the third portion 99c of the second passage element 97 is connected to the third passage element 98 at a position deviated from the bottom 98a of the third passage element 98. The third portion 99c of the second passage element 97 may be communicated with the conical bottom 98a of the third passage element 98.

Thus, the third passage element 98 can be paraphrased as a second rising portion which rises from the end of the third portion 99c of the second passage element 97 in the radial direction of the cylindrical body 39 and is opened in the outer peripheral surface of the screw main body 37.

In addition, by virtue of the provision of the passage 95 in the cylindrical body 39, the passage 95 is made eccentric from the axis line O1 of the rotating shaft 38. Thus, the passage 95 is deviated from the axis line O1 and revolves around the axis line O1 when the screw main body 37 rotates.

An inner diameter of a hole constituting the second passage element 97 is set to not less than 1 mm and less than 6 mm, for example, and is preferably not less than 1 mm and not more than 5 mm. An inner diameter of the second passage element 97 is smaller than an inner diameter of the first passage element 96 serving as an inlet. Further, a cross-sectional area along the radial direction of the second passage element 97 is set to be much smaller than a cross-sectional area of the conveyance path 51 along the radial direction of the cylinder portion 33.

According to this embodiment, the cylindrical body 39 has a cylindrical wall surface 100 defining the shape of the hole constituting the first to third passage elements 96, 97, and 98. The wall surface 100 continuously surrounds the first to third passage elements 96, 97, and 98 in the circumferential direction. In other words, the first to third passage elements 96, 97, and 98 surrounded by the wall surface 100 are hollow spaces allowing only circulation of a raw material, and the spaces include no element constituting the screw main body 37. When the screw main body 37 rotates, the wall surface 100 revolves around the axis line O1 without being rotated centering on the axis line O1.

According to this constitution, the raw material blended in a first extruder 2 and having a flowability is continuously supplied from the supply port 34 of the second extruder 3 to the conveyance path 51. The raw material supplied to the second extruder 3 is introduced to the outer peripheral surface of the conveyance portion 91 closest to the base end of the screw main body 37, as shown by the arrow D in FIG. 32.

Since the screw 21 rotates to the left in the counterclockwise direction as the screw 21 is viewed from the direction of the base end of the rotating shaft 38, the flight 93 of the conveyance portion 91 conveys the raw material, introduced from the supply port 34, toward the adjacent barrier portions 92 on the side of the base end of the screw main body 37, as shown by the solid arrows in FIG. 32. Namely, the flight 93 reversely sends the raw material, introduced from the supply port 34, toward the base end of the screw main body 37.

In this case, the shear action occurring due to a speed difference between the flight 93 revolving in the conveyance path 51 and the inner peripheral surface of the cylinder portion 33 is applied to the raw material, and, at the same time, the raw material is stirred by subtle degrees of twist of the flight 93. As a result, the raw material is fully kneaded, and dispersion of a polymer component of the raw material is advanced.

The raw material subjected to the shear action reaches a boundary between the conveyance portion 91 and the barrier portion 92 along the conveyance path 51. Since the flight 94 of the barrier portion 92 is twisted to the right to convey the raw material from the base end of the screw main body 37 toward the leading end thereof when the screw 21 rotates to the left, the flight 94 dams the raw material sent by the flight 93. In other words, when the screw 21 rotates to the left, the flight 94 of the barrier portion 92 limits the flow of the raw material sent by the flight 93 and interferes with passage of the raw material through a clearance between the barrier portion 92 and the inner peripheral surface of the cylinder portion 33.

Figure 33:
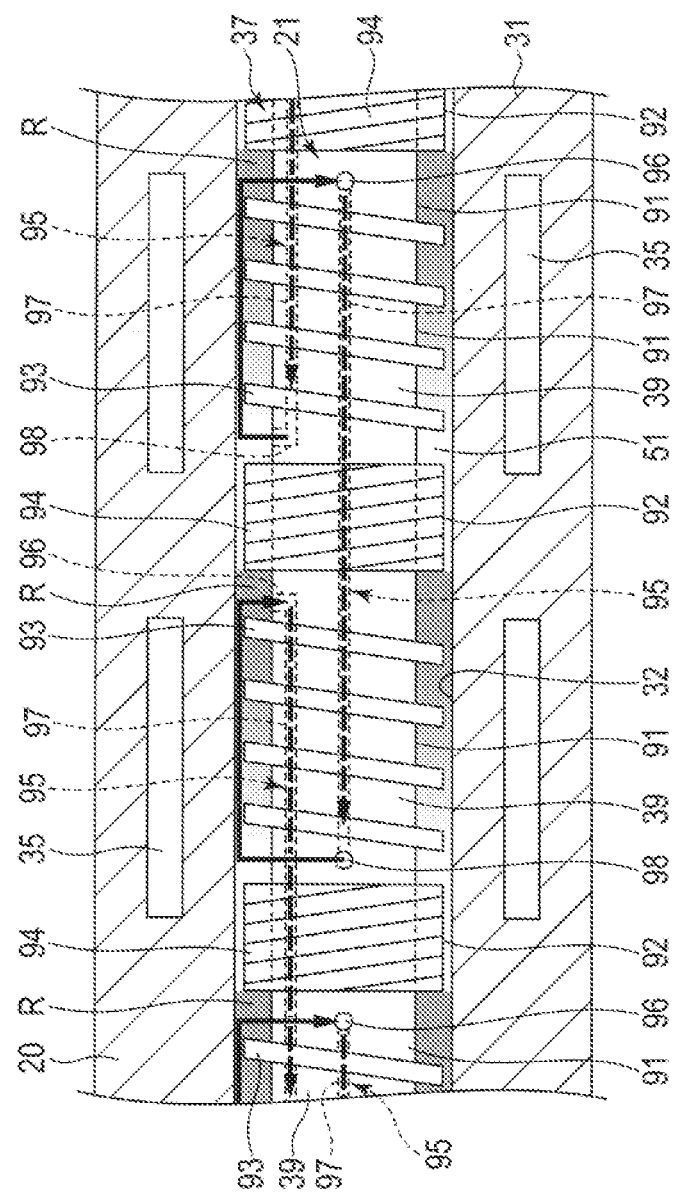
FIG. 33 is a cross-sectional view of the second extruder schematically showing the flowing direction of the raw material when the screw rotates in the third embodiment.

As a result, the pressure of the raw material is increased at the boundary between the conveyance portion 91 and the barrier portion 92. More specifically, FIG. 33 shows the filling rate of the raw material at the places in the conveyance path 51, which correspond to the conveyance portion 91 of the screw main body 37, with gradations, and the filling rate of the raw material becomes greater as the tone becomes darker. As seen in FIG. 33, in the conveyance portion 91, the filling rate of the raw material becomes greater as it approaches the barrier portion 92, and immediately before the barrier portion 92, the filling rate of the raw material is 100%.

Thus, a raw-material receiver R in which the filling rate of the raw material is 100% is formed immediately before the barrier portion 92. In the raw-material receiver R, the flow of the raw material is dammed, whereby the pressure of the raw material is increased. The raw material whose pressure has been increased flows into the second passage element 97 from the first passage element 96 serving as the inlet of the passage 95, as shown by the dashed arrows in FIGS. 32 and 33.

The cross-sectional area along the radial direction of the second passage element 97 is smaller than the cross-sectional area of the conveyance path 51 along the radial direction of the cylinder portion 33. In other words, since the inner diameter of the second passage element 97 is much smaller than the outer diameter of the screw main body 37, when the raw material passes through the second passage element 97, the raw material is rapidly squeezed, and elongation action is applied to the raw material.

In addition, since the cross-sectional area of the second passage element 97 is satisfactorily smaller than the cross-sectional area of the conveyance path 51, despite the raw material accumulated in the raw-material receiver R flowing into the first passage element 96, the raw-material receiver R immediately before the barrier portion 92 does not disappear. Thus, even if some variation occurs in the flow volume of the raw material sent into the barrier portion 92 by the flight 93, the variation in the flow volume can be absorbed by the raw material accumulated in the raw-material receiver R. Thus, the raw material is supplied to the passage 95 in a stable state at all times.

As shown by the solid arrows in FIG. 33, the raw material passing through the second passage element 97 is returned onto the outer peripheral surface of the conveyance portion 91 adjacent on the side of the leading end of the screw main body 37 through the third passage element 98. The returned raw material is conveyed toward the base end of the screw main body 37 by the flight 93 of the conveyance portion 91 and is subjected to the shear action again in the process of conveyance. The raw material subjected to the shear action flows from the first passage element 96 of the passage 95 into the second passage element 97 and, at the same time, is subjected to the elongation action again in the process of circulating through the second passage element 97.

In this embodiment, the conveyance portions 91 and the barrier portions 92 are alternately arranged in the axial direction of the screw main body 37, and the passages 95 are arranged at intervals in the axial direction of the screw main body 37. Thus, the raw material introduced from the supply port 34 to the screw main body 37 is continuously conveyed in the direction from the base end of the screw main body 37 to the leading end thereof while being alternately and repeatedly subjected to the shear action and the elongation action, as shown by the arrows in FIGS. 32 and 33. Accordingly, the kneading degree of the raw material is enhanced, and dispersion of a polymer component of the raw material is facilitated.

The second passage elements 97 of the passages 95 are individually opened in the outer peripheral surface of the screw main body 37 through the first passage elements 96 and the third passage elements 98. Thus, in each of the passages 95, the raw material flowing from the first passage element 96 into the second passage element 97 returns to the outer peripheral surface of the screw main body 37, always through the third passage element 98, so that the raw materials are not mixed with each other between the passages 95.

Accordingly, it is possible to avoid situations where the kneading degree of the raw material becomes excessive, so that appropriate kneading suitable for a desired kneading degree can be achieved.

Since the passage 95 applying the elongation action to the raw material extends in the axial direction of the screw main body 37 at a position eccentric from the axis line O1 serving as a rotation center of the screw main body 37, the passage 95 revolves around the axis line O1. Namely, the cylindrical wall surface 100 specifying the passage 95 revolves around the axis line O1 without being rotated centering on the axis line O1.

Thus, when the raw material passes through the passage 95, although the raw material is subjected to centrifugal force, shear force accompanying the rotation of the wall surface 100 on its axis does not act on the raw material. Accordingly, the raw material returning to the outer peripheral surface of the screw main body 37 through the passage 95 is mainly subjected to the elongation action. Accordingly, a place where the shear action is applied to the raw material and a place where the elongation action is applied to the raw material are clearly determined, so that the kneading degree of the raw material can be controlled with high accuracy.

Also in the third embodiment, the cylindrical bodies 39 to be inserted onto the rotating shaft 38 can be freely selected and exchanged according to the kneading degree of the raw material, for example, and the positions of the conveyance portions 91 and the barrier portions 92 can be changed within the range of the length of the screw main body 37.

For example when the flight 93 is locally worn to adversely affect conveyance of the raw material or a physical property thereof, the cylindrical body 39 having the worn flight 93 may be replaced with a preliminary cylindrical body 39 having a new flight 93.

Accordingly, the other cylindrical bodies 39 and the rotating shaft 38 of the screw main body 37 can be repeatedly used, and all components of the screw main body 37 may not be replaced with new ones.

Thus, since it is economical and wear can be corresponded by partial repair of the screw main body 37, a time for stopping operation of a high shear processing device 1 can be reduced to the minimum necessary.

The passage 95 through which the elongation action is applied to the raw material is formed crossing over between the two cylindrical bodies 39 constituting the conveyance portion 91 and the cylindrical body 39 constituting the barrier portion 92. Thus, in any of the three cylindrical bodies 39, a relative positional relationship between the flight 93 or 94 and the passage 95 is fixedly determined in both the axial and circumferential directions of the screw main body 37. Thus, special alignment between the flights 93 and 94 and the passage 95 is not required.

According to the third embodiment, the passage 95 is formed crossing over among the three cylindrical bodies 39 by firmly adhering the end surfaces 39a of the three adjacent cylindrical bodies 39 to each other. Namely, when the passage 95 is formed in the screw main body 37, the cylindrical body 39 which is much shorter than the entire length of the screw main body 37 may be machined using a drill, for example. Thus, when the passage 95 is formed, workability and handling of a workpiece are facilitated.

In addition, in the third embodiment, the passage 95 through which the elongation action is applied to the raw material is divided into three portions at a boundary between the barrier portion 92 and the two conveyance portions 91 interposing the barrier portion 92 in between. Thus, the first portion 99a and the third portion 99c of the second passage element 97 are formed in the cylindrical body 39 constituting the conveyance portion 91, and the second portion 99b of the second passage element 97 is formed in the cylindrical body 39 constituting the barrier portion 92.

According to this constitution, when the passage 95 crosses over among the two conveyance portions 91 and the barrier portion 92, the three cylindrical bodies 39 forming the first to third portions 99a, 99b, and 99c of the passage 95 can be sectionalized for each of the flights 93 and 94. As a result, the individual cylindrical bodies 39 having the first to third portions 99a, 99b, and 99c of the passage 95 can be easily produced, selected, and managed.

Variation of Third Embodiment

Figure 34:
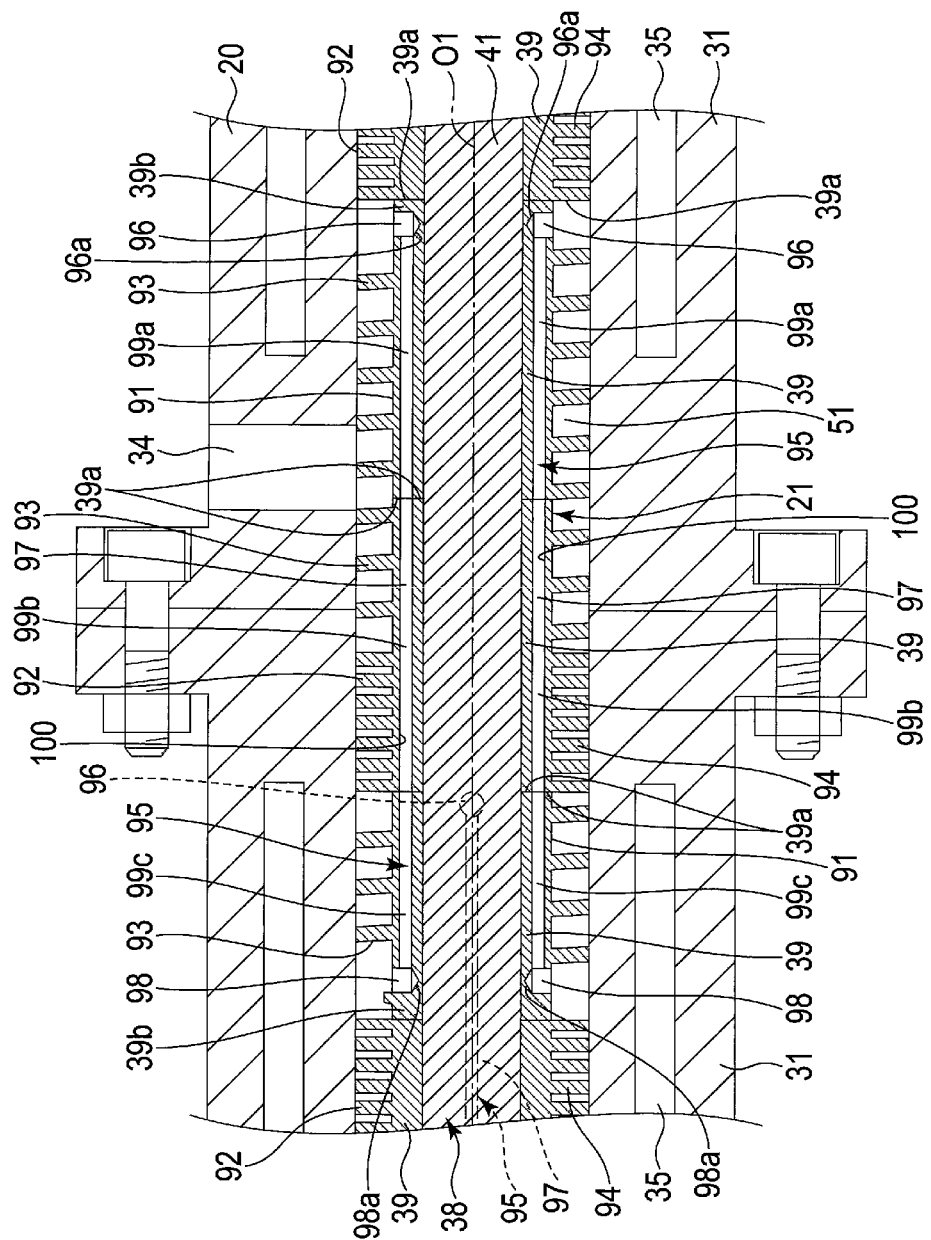
FIG. 34 is a cross-sectional view of the second extruder schematically showing a variation of the third embodiment.
Figure 35:
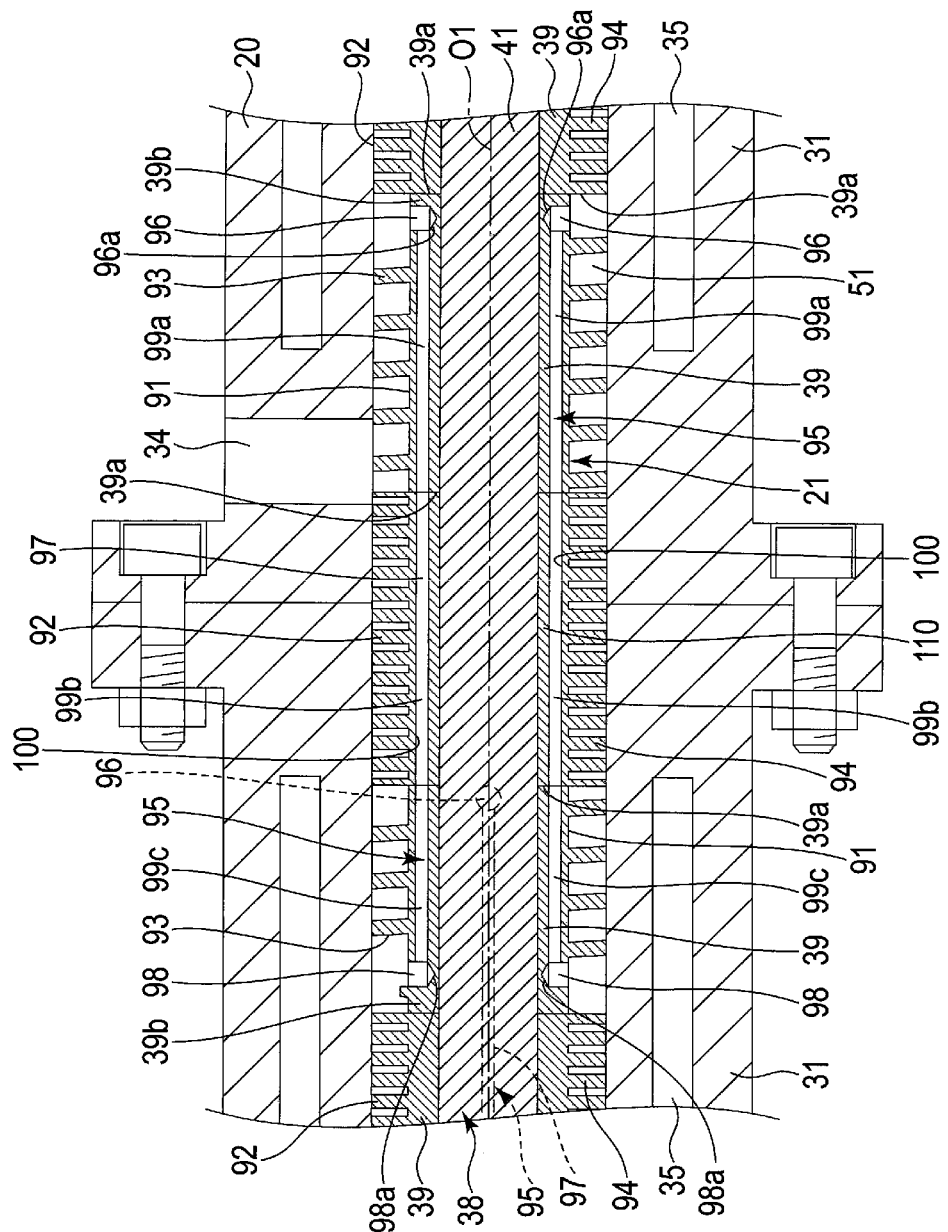
FIG. 35 is a cross-sectional view of the second extruder schematically showing a state in which the combination of the cylindrical bodies is changed in the variation of the third embodiment.

FIGS. 34 and 35 disclose a variation related to the third embodiment.

In the variation shown in FIG. 34, all the flights 94 constituting the barrier portion 92 and some of the flights 93 constituting the conveyance portion 91 are continuously formed on the outer peripheral surface of the cylindrical body 39 formed with the second portion 99*b* of the second passage element 97. Namely, the second portion 99*b* of the second passage element 97 is formed in the cylindrical body 39 formed with two kinds of the flights 93 and 94.

In such a constitution, when an exclusive cylindrical body 110 in which the flights 94 for the barrier portion 92 are formed in the entire region of the outer peripheral surface as shown in FIG. 35 is provided as the cylindrical body 39 formed with the second portion 99*b* of the second passage element 97, the cylindrical body 110 can be exchanged with the cylindrical body 39 formed with two kinds of the flights 93 and 94.

Consequently, a ratio of a region occupied by the flight 93 for the conveyance portion 91 and a region occupied by the flight 94 for the barrier portion 92 can be changed within the range of the lengths of the three cylindrical bodies 39 and 110 forming the passage 95, according to the kneading degree of the raw material, for example.

Fourth Embodiment

Figure 36:
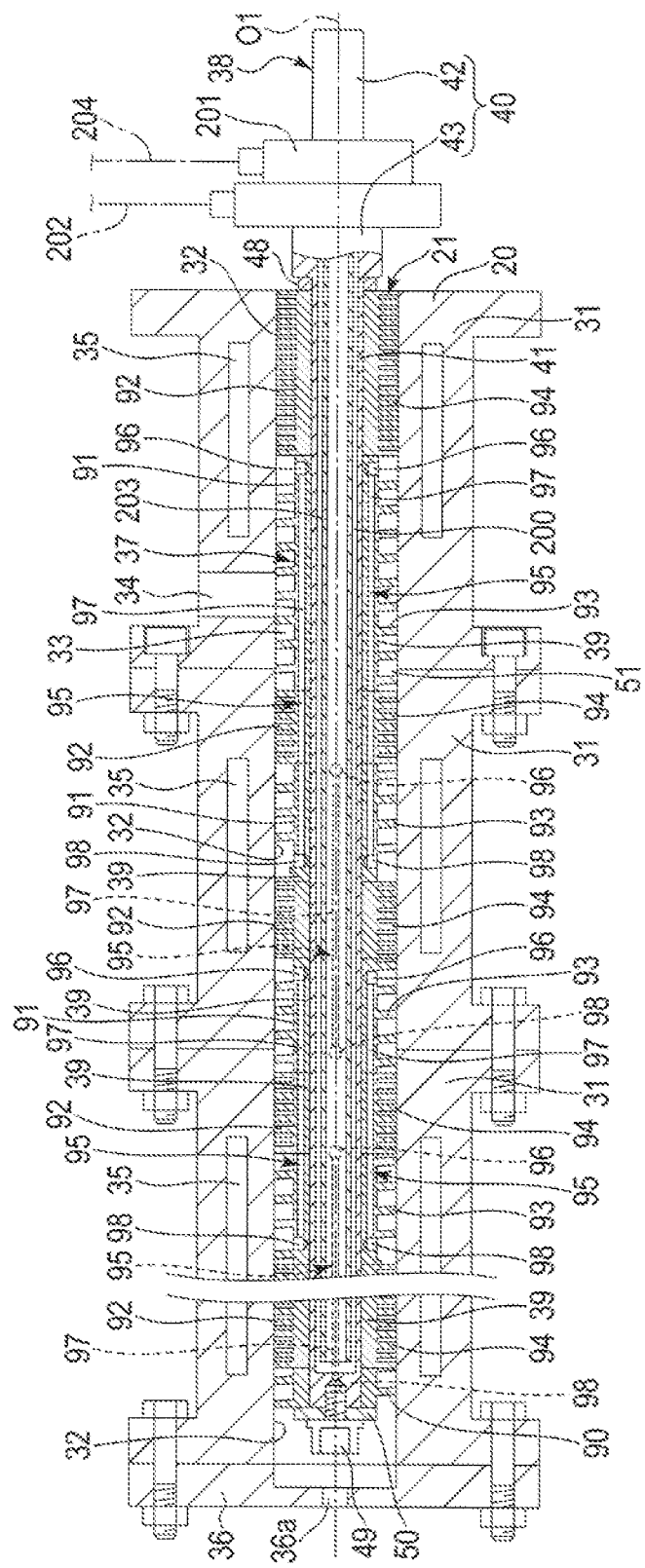
FIG. 36 is a cross-sectional view of a second extruder used in a fourth embodiment.

FIG. 36 discloses a fourth embodiment. The fourth embodiment differs from the third embodiment in terms of a rotating shaft 38. Other configurations of a screw 21 are essentially similar to those of the third embodiment. Thus, in the fourth embodiment, the same reference symbols denote the same components as those according to the third embodiment, and their descriptions will be omitted.

As shown in FIG. 36, a refrigerant passage 200 is formed in the rotating shaft 38. The refrigerant passage 200 coaxially extends along the axis line O1 of the rotating shaft 38. One end of the refrigerant passage 200 is connected to outlet piping 202 through a rotary joint 201 at a place of a joint portion 42. The other end of the refrigerant passage 200 is closed in a liquid-tight manner by the leading end of the rotating shaft 38.

A refrigerant introduction pipe 203 is coaxially inserted into the refrigerant passage 200. One end of the refrigerant introduction pipe 203 is connected to inlet piping 204 through the rotary joint 201. The other end of the refrigerant introduction pipe 203 is opened in the refrigerant passage 200 near the other end of the refrigerant passage 200.

In the fourth embodiment, a refrigerant such as water or oil is sent from the inlet piping 204 into the refrigerant passage 200 through the rotary joint 201 and the refrigerant introduction pipe 203. The refrigerant sent into the refrigerant passage 200 returns to the joint portion 42 of the rotating shaft 38 through a gap between an inner peripheral surface of the refrigerant passage 200 and an outer peripheral surface of the refrigerant introduction pipe 203 and, at the same time, is returned to the outlet piping 202 through the rotary joint 201.

According to the fourth embodiment, since the refrigerant circulates along the axial direction of the rotating shaft 38, the screw main body 37 can be cooled using the refrigerant. Thus, the temperature of the screw main body 37 in contact with the raw material can be properly adjusted, and deterioration of a resin, a change in viscosity, and the like based on an increase in temperature of the raw material can be prevented.

While certain embodiments have been described, these embodiments have been presented by way of example only, and are not intended to limit the scope of the inventions. The novel embodiments described herein may be embodied in a variety of other forms, and various omissions, substitutions, and changes may be made without departing from the spirit of the invention.

For example, a screw main body fully kneading a raw material may be configured by selectively combining and inserting the cylindrical body having the passage disclosed in the first embodiment, the cylindrical body having the passage disclosed in the second embodiment, and the cylindrical body having the passage disclosed in the third embodiment on a rotating shaft.

A cross-sectional shape of a passage through which the elongation action is applied to a raw material may not be a circular hole. The cross-sectional shape of the passage may be configured to be an elliptical or polygonal hole, for example, and the cross-sectional shape of the passage is not limited particularly.

Further, in the first embodiment, there has been described a case where the screw rotates to the left in the counterclockwise direction as the screw main body is viewed from the direction of the base end of the rotating shaft. However, the present invention is not limited to this case. For example, the screw may be rotated to the right in the clockwise direction.

The barrier portion of the screw main body may not be constituted of a spirally twisted flight. For example, the barrier portion may be constituted of an annular large diameter portion having an outer peripheral surface continuing in the circumferential direction of the screw main body. It is desirable that the large diameter portion has a width along the axial direction of the screw main body and has a smooth annular shape free from any recess, cut-out, and the like on its outer peripheral surface.

The third extruder which removes a gas component contained in a kneaded material extruded from the second extruder is not specified by a single screw extruder, and a twin screw extruder may be used.

The continuous high shear processing device according to the present invention may include at least a first extruder which preliminarily kneads a raw material and a second extruder which fully kneads the raw material, and the third extruder which removes gaseous substances and volatile components may be omitted. When the third extruder is omitted, at least one vent port which removes gaseous substances and volatile components from a raw material in the process of kneading may be provided at an intermediate portion of the second extruder.

What is claimed is:

1. A kneading method comprising:
supplying a raw material to a screw for an extruder, which conveys a raw material while kneading the raw material, rotating in a barrel and continuously conveying the raw material in an axial direction of the screw with the screw, wherein the screw comprises:
a screw main body having a linear axis line along a conveyance direction of the raw material, and configured to rotate around the axis line;
a conveyance portion provided on an outer peripheral surface along a circumferential direction of the screw main body and having a flight conveying the raw material in an axial direction of the screw main body when the screw main body rotates;
a passage comprised by the screw main body and including a first passage element into which the raw material conveyed by the flight flows, a second passage element through which the raw material flowing in from the first passage element flows, and a third passage element through which the raw material having flown through the second passage element returns to the outer peripheral surface of the screw main body, wherein the screw main body comprises a rotating shaft provided coaxially with the axis line and a plurality of cylindrical bodies coaxially inserted into an outer peripheral surface of the rotating shaft so as to rotate following the rotating shaft and arranged in the axial direction of the rotating shaft, and a barrier portion which restricts flow of the raw material due to the flight to increase a pressure of the raw material, at least a portion of the conveyance portion is formed on outer peripheral surfaces of the cylindrical bodies adjacent to each other on the rotating shaft, and the passage is formed in the cylindrical body so as to cross over between the adjacent cylindrical bodies, and the first passage element is provided at a position adjacent to the barrier portion; and guiding the raw material to the passage of the screw when the screw rotates and returning the raw material to an outer peripheral surface of the screw through the passage.

2. A kneading method comprising:

supplying a raw material to a screw for an extruder, which conveys a raw material while kneading the raw material, rotating in a barrel and continuously conveying the raw material in an axial direction of the screw with the screw, wherein the screw comprises:

a screw main body having a linear axis line along a conveyance direction of the raw material, and configured to rotate around the axis line;

a conveyance portion provided on an outer peripheral surface along a circumferential direction of the screw main body and having a flight conveying the raw material in an axial direction of the screw main body when the screw main body rotates;

a passage comprised by the screw main body and including an inlet into which the raw material conveyed by the flight flows, a passage main body through which the raw material flowing in from the inlet flows, and an outlet through which the raw material having flown through the passage main body returns to the outer peripheral surface of the screw main body, wherein the screw main body comprises a rotating shaft provided coaxially with the axis line and a plurality of cylindrical bodies coaxially inserted into an outer peripheral surface of the rotating shaft so as to rotate following the rotating shaft and arranged in the axial direction of the rotating shaft, and a barrier portion which restricts flow of the raw material due to the flight to increase a pressure of the raw material, and at least a portion of the conveyance portion is formed on an outer peripheral surface of at least one of the cylindrical bodies, and the passage is formed in at least one of the cylindrical bodies, and the inlet is provided at a position adjacent to the barrier portion; and guiding the raw material to the passage of the screw when the screw rotates and returning the raw material to an outer peripheral surface of the screw through the passage.

* * * * *